US012634870B2

(12) United States Patent
Shin et al.

(10) Patent No.: US 12,634,870 B2
(45) Date of Patent: May 19, 2026

(54) METHOD AND APPARATUS FOR SIDELINK POSITIONING IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Youngbum Kim, Gyeonggi-do (KR); Kyoungmin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 302 days.

(21) Appl. No.: 18/340,372

(22) Filed: Jun. 23, 2023

(65) Prior Publication Data

US 2023/0422204 A1     Dec. 28, 2023

(51) Int. Cl.
| | |
|---|---|
| *H04W 4/00* | (2018.01) |
| *H04L 5/00* | (2006.01) |
| *H04W 64/00* | (2009.01) |

(52) U.S. Cl.
CPC ........... *H04W 64/00* (2013.01); *H04L 5/0051* (2013.01)

(58) Field of Classification Search
CPC . H04W 64/00; H04W 28/0289; H04W 72/20; H04W 92/18
See application file for complete search history.

(56) References Cited

U.S. PATENT DOCUMENTS

| | | |
|---|---|---|
| 2021/0234650 A1 | 7/2021 | Kim et al. |
| 2022/0174655 A1 | 6/2022 | Tsai et al. |
| 2022/0385423 A1 | 12/2022 | Ko et al. |
| 2023/0042138 A1 | 2/2023 | Shin et al. |
| 2023/0284242 A1* | 9/2023 | Ko .......................... H04W 72/25 |
| | | 370/252 |
| 2024/0188100 A1* | 6/2024 | Zhang ................... H04L 5/0094 |

(Continued)

FOREIGN PATENT DOCUMENTS

| | | |
|---|---|---|
| EP | 4 216 643 | 7/2023 |
| KR | 10-2023-0013990 | 1/2023 |

(Continued)

OTHER PUBLICATIONS

International Search Report dated Sep. 21, 2023 issued in counterpart application No. PCT/KR2023/008757, 7 pages.

(Continued)

*Primary Examiner* — Omoniyi Obayanju
(74) *Attorney, Agent, or Firm* — The Farrell Law Firm, P.C.

(57)     ABSTRACT

A method performed by a terminal in a wireless communication system is provided. The method includes obtaining information on transmission parameters associated with a SL positioning reference signal, identifying a resource pool associated with the SL positioning reference signal, performing a measurement based on the resource pool associated with the SL positioning reference signal, and determining at least one transmission parameter associated with the SL positioning reference signal based on the measurement and the information on the transmission parameters. The transmission parameters include at least one of a comb size associated with the SL positioning reference signal or a number of symbols for the SL positioning reference signal in a slot.

13 Claims, 19 Drawing Sheets

(56) References Cited

U.S. PATENT DOCUMENTS

| 2024/0397472 | A1* | 11/2024 | Li | G01S 5/0009 |
| 2025/0142292 | A1* | 5/2025 | Hoang | H04L 5/0094 |

FOREIGN PATENT DOCUMENTS

| WO | WO 2021/086093 | 5/2021 |
| WO | WO 2021/240478 | 12/2021 |
| WO | WO 2022/059887 | 3/2022 |
| WO | WO 2022/060730 | 3/2022 |
| WO | WO 2023/154782 | 8/2023 |

OTHER PUBLICATIONS

3GPP TS 38.321 V 16.8.0, 3GPP, 3rd Generation Partnership Project; Technical Specification Group Radio Access Network; NR; Medium Access Control (MAC) Protocol Specifiation (Release 16), Mar. 2022, 159 pages.
Samsung, "On Resource Allocation for SL Positioning Reference Signal", R1-2303135, 3GPP TSG RAN WG1 #112bis-e, Apr. 17-26, 2023, 8 pages.
European Search Report dated Aug. 25, 2025 issued in counterpart application No. 23827561.4-1206, 11 pages.

* cited by examiner

Out-of-coverage
scenario

Inter-cell V2X
communitation
scenario

Figure 9:
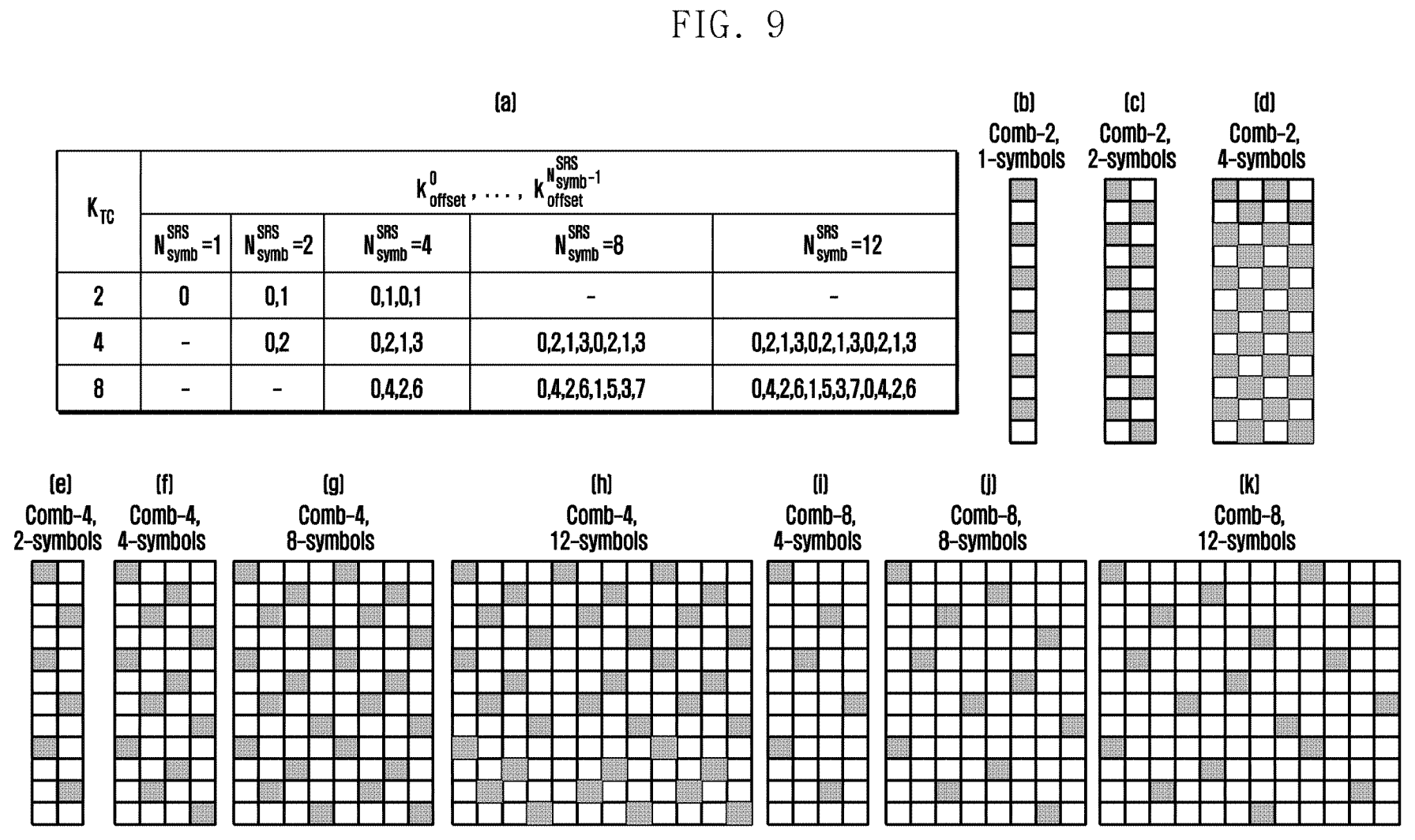

| $K_{TC}$ | $k_{offset}^0, \ldots, k_{offset}^{N_{symb}^{SRS}-1}$ | | | | |
|---|---|---|---|---|---|
| | $N_{symb}^{SRS}=1$ | $N_{symb}^{SRS}=2$ | $N_{symb}^{SRS}=4$ | $N_{symb}^{SRS}=8$ | $N_{symb}^{SRS}=12$ |
| 2 | 0 | 0,1 | 0,1,0,1 | - | - |
| 4 | - | 0,2 | 0,2,1,3 | 0,2,1,3,0,2,1,3 | 0,2,1,3,0,2,1,3,0,2,1,3 |
| 8 | - | - | 0,4,2,6 | 0,4,2,6,1,5,3,7 | 0,4,2,6,1,5,3,7,0,4,2,6 |

[b]
Comb-2,
1-symbols

[c]
Comb-2,
2-symbols

[d]
Comb-2,
4-symbols

[e]
Comb-4,
2-symbols

[f]
Comb-4,
4-symbols

[g]
Comb-4,
8-symbols

[h]
Comb-4,
12-symbols

[i]
Comb-8,
4-symbols

[j]
Comb-8,
8-symbols

[k]
Comb-8,
12-symbols

METHOD AND APPARATUS FOR SIDELINK POSITIONING IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0077530, which was filed in the Korean Intellectual Property Office on Jun. 24, 2022, the entire disclosure of which is incorporated herein by reference.

BACKGROUND

1. Field

The disclosure relates generally to a wireless communication system, and more particularly, to a method and apparatus for performing positioning (e.g., location measurement) through a sidelink (SL).

2. Description of the Related Art

5th generation (5G) mobile communication technologies define broad frequency bands such that high transmission rates and new services are possible, and can be implemented in "sub 6 gigahertz (GHz)" bands such as 3.5 GHz, and also in "above 6 GHz" bands, which may be referred to as mmWave, including 28 GHz and 39 GHz.

In addition, it has been considered to implement 6th generation (6G) mobile communication technologies (e.g., referred to as "beyond 5G systems") in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the initial development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN), which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with extended Reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Furthermore, such development of 5G mobile communication systems will serve as a basis for developing new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure is to provide a method and apparatus for performing positioning (e.g., location measurement) through an SL.

Another aspect of the disclosure is to provide a method for performing positioning through an SL.

Another aspect of the disclosure is to provide methods for performing congestion control when performing positioning through an SL.

In accordance with an aspect of the disclosure, a method is provided for a terminal in a wireless communication system. The method includes obtaining information on transmission parameters associated with a SL positioning reference signal (PRS), identifying a resource pool associated with the SL PRS, performing a measurement based on the resource pool associated with the SL PRS, and determining at least one transmission parameter associated with the SL PRS based on the measurement and the information on the transmission parameters. The transmission parameters include at least one of a comb size associated with the SL PRS or a number of symbols for the SL PRS in a slot.

In accordance with another aspect of the disclosure, a terminal is provided for use in a wireless communication system. The terminal includes a transceiver, and a controller coupled with the transceiver and configured to obtain information on transmission parameters associated with a SL PRS, identify a resource pool associated with the SL PRS, perform a measurement based on the resource pool associated with the SL PRS, and determine at least one transmission parameter associated with the SL PRS based on the measurement and the information on the transmission parameters. The transmission parameters include at least one of a comb size associated with the SL PRS or a number of symbols for the SL PRS in a slot.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates performing positioning using a round trip time (RTT) method according to an embodiment;

FIG. 9 illustrates a pattern of an S-PRS, based on an uplink (UL) PRS according to an embodiment;

DETAILED DESCRIPTION

Figure 1A:
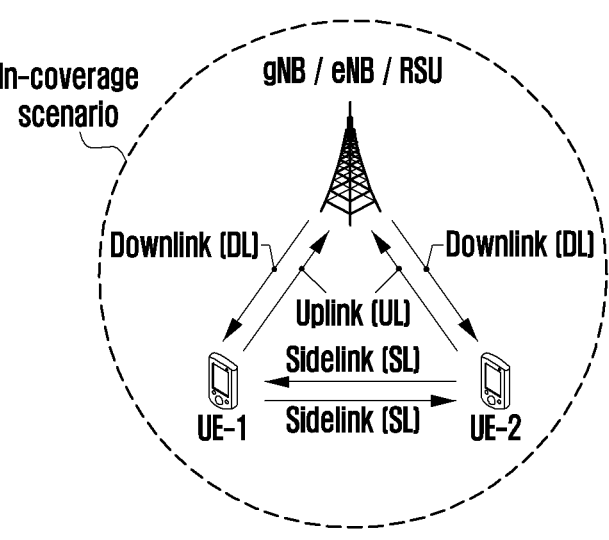
FIG. 1A illustrates an SL communication scenario in a wireless communication system according to an embodiment.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

Various advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims.

Throughout the specification, the same reference numerals may refer to the same elements.

Each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" may refer to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, e.g., software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, a "unit" may include one or more processors.

Embodiments of the disclosure will be described herein focusing a wireless access network, i.e., NR, and a packet core, i.e., a 5G system, a 5G core network, or a next generation (NG) core, according to the 5G mobile communication standard specified by the 3rd generation partnership project (3GPP), which is a mobile communication standardization organization. However, the subject matter of the disclosure can be also applied to other communication systems having similar technical backgrounds through slight modification without departing from the scope of the disclosure as will be apparent to those skilled in the art.

In the 5G system, a network data collection and analysis function (NWDAF), which is a network function (NF) of collecting, analyzing, and providing data in the 5G network, may be defined to support network automation. The NWDAF may collect information from the 5G network, store and analyze the collected information, and provide a result of analysis to an unspecified NF. The result of analysis may be used independently in each NF.

Some terms and names defined in the 3GPP standards (e.g., 5G, NR, long term evolution (LTE), or similar system standards) will be used for the convenience of description. However, the disclosure is not limited by such terms and names, and may also be applied to any other system that complies with any other standard.

Further, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of 4th generation (4G) communication systems, efforts have been made to develop an improved 5G communication system (e.g., NR). To accomplish higher data rates, the 5G communication system is designed to enable resources in extremely high frequency (mmWave) bands (e.g., 28 GHz frequency band). To decrease propagation loss of the radio waves and increase the transmission distance, the beamforming, massive MIMO, FD-MIMO, array antenna, an analog beamforming, large scale antenna techniques, etc., have been discussed and adopted in the 5G communication system. In addition, unlike the LTE, the 5G communication system supports various SCSs such as 15 kHz, 30 kHz, 60 kHz, and 120 kHz, uses a polar coding for a physical control channel, and uses a LDPC for a physical data channel Besides, cyclic prefix-orthogonal frequency division multiplexing (CP-OFDM) as well as discrete Fourier transform-spread-OFDM (DFT-S-OFDM) are used as a waveform for UL transmissions. LTE supports hybrid automatic repeat request (HARQ) retransmission in units of transport blocks (TBs), whereas 5G can additionally support HARQ retransmission based on a code block group (CBG) in which a plurality of code blocks (CBs) are bundled.

Further, for system network improvement in 5G communication systems, technology developments have been made for an evolved small cell, advanced small cell, cloud radio access network (RAN), ultra-dense network, device to device communication (D2D), wireless backhaul, V2X network, cooperative communication, coordinated multi-points (COMP), reception interference cancellation, etc.

The Internet is now evolving to the Internet of things (IoT) in which distributed components, i.e., things, exchange and process information. The Internet of everything (IoE), which is a combination of the IoT technology and big data processing, technology through connection with a cloud server, has also emerged. As technology elements, such as sensing technology, wired/wireless communication and network infrastructure, service interface technology, and security technology, have been demanded for Iot' implementation, a sensor network for machine-to-machine connection, machine-to-machine (M2M) communication, machine type communication (MTC), etc., have been recently researched.

Such an IoT environment may provide intelligent Internet technology services by collecting and analyzing data generated among connected things. IoT may be applied to a variety of fields including smart homes, smart buildings, smart cities, smart cars or connected cars, a smart grid, health care, smart appliances, and advanced medical services through convergence and combination between the existing, information technology and various industries.

Various attempts have been made to apply a 5G communication system to IoT networks. For example, technologies of sensor network, M2M communication, and MTC have been implemented by techniques for beam-forming, MIMO, and array antennas, which correspond to the 5G communication technology. As the big data processing technology as described above, application of a cloud RAN would be an example of convergence between the 5G technology and the IoT technology.

As described above, a plurality of services may be provided to a user in a communication system, and in order to provide the plurality of services to the user, a method of providing each service in the same time interval according to a characteristic thereof and an apparatus using the same are needed.

Various services provided by the 5G communication system are being researched, and one thereof is a service that satisfies requirements of low latency and high reliability.

In addition, the demand for mobile services, and location based service (LES), which is mainly driven by two requirements, i.e., emergency services and commercial applications, are rapidly growing.

In particular, in communication using an Si, a NR SL system supports unicast communication, groupcast (or multicast) communication, and broadcast communication between terminals. In addition, unlike LTE SLs that aim to transmit and receive basic safety information required for driving a vehicle on a road, NR SLs aim to provide more advanced services such as platooning, advanced driving, extended sensor, and remote driving.

In particular, in NR SLs, positioning (or location measurement) may be performed through an SL between terminals, in other words, a method of measuring a location of a terminal by using a positioning signal transmitted through an SL may be considered, Conventionally, a method of measuring a location of a terminal by using a positioning signal transmitted through a DL and a UL between a terminal and a BS is feasible when the terminal is within the coverage of the BS, However, by introducing SL positioning, the location of a terminal may be measured even when the terminal is Out of a coverage of a BS.

Specifically, SL positioning may be performed through signal transmission. Provided below are examples of signals that may be used for SL positioning. However, the scope of the disclosure is not limited to the following signals, and the disclosure may be applied to other signals used when positioning is performed through the SL.

S-PRS

Measurement report

Location information transfer

An S-PRS is a signal transmitted by a terminal for positioning measurement. A terminal receiving the S-PRS may perform positioning measurement using this signal, and the measurement method using the S-PRS may vary depending on the positioning method.

A terminal that has measured positioning may transmit corresponding measurement information to another terminal, a BS, or a location server (LS). The transmitted measurement can be referred to as a measurement report.

Location information transfer may refer to information transmitted to indicate a known location of a terminal to another terminal. Using the corresponding information, the terminal may measure a relative position and an absolute position. In addition to the above information, additional information required to perform SL positioning may be exchanged between the terminals. For example, reliability of known location information may be included.

The terminal may allocate a resource for transmitting such a positioning signal and transmit the signals in the corresponding resource. In addition, considering the degree of congestion of SL transmission, the terminal may control whether to transmit the signal and related transmission parameters. Existing congestion control is defined for a PSSCH. However, congestion control for positioning signals may not be the same as for PSSCH transmission. For example, the positioning signal may be transmitted in the same resource as the PSSCH transmission resource, but may be transmitted in a dedicated resource for positioning signal transmission to prevent collision with data transmission. In addition, an S-PRS may be transmitted in time and frequency different from those in PSSCH transmission, and accordingly, parameters for S-PRS transmission may be defined differently from those in PSSCH transmission.

In accordance with an embodiment of the disclosure, a method and apparatus are provided for performing congestion control while measuring a location of a UE (positioning) in an SL. When positioning signals are transmitted, collision of positioning signals may be prevented through congestion control, and thus positioning accuracy may be improved.

FIGS. 1A to 1D illustrate SL communication scenarios in a wireless communication system according to embodiments.

Specifically, FIG. 1A illustrates an example of an in-coverage (IC) scenario in which all terminals (e.g., UE-1 and UE-2) communicating through an SL are located within the coverage of a BS.

Referring to FIG. 1A, all terminals may receive data and control information from the BS through a DL or transmit data and control information to the BS through a UL. In this case, the data and the control information may be for SL communication. The data and the control information may also be for general cellular communication. In addition, the terminals may transmit/receive data and control information for corresponding communication through an SL.

Figure 1B:
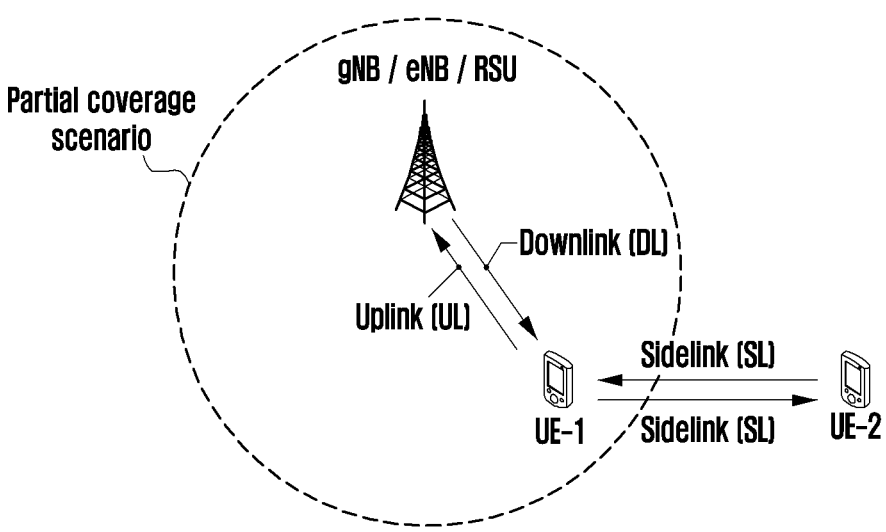
FIG. 1B illustrates an SL communication scenario in a wireless communication system according to an embodiment.

FIG. 1B illustrates an example of a partial coverage (PC) scenario in which some terminals (e.g., UE-1) are located inside the coverage of the BS and some terminals (e.g., UE-2) are located outside the coverage of the BS.

Referring to FIG. 1B, the terminal (e.g., UE-1) located inside the coverage of the BS may receive data and control information from the BS through a DL or transmit data and control information to the BS through a UL. The terminal (e.g., UE-2) located outside the coverage of the BS cannot receive data and control information from the BS through a DL and cannot transmit data and control to the BS through a UL. The terminal (e.g., UE-2) may transmit/receive data and control information for corresponding communication through the SL.

Figure 1C:
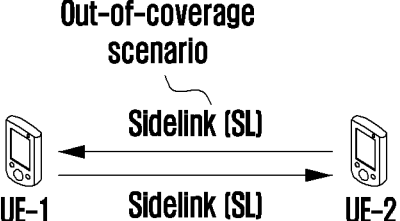
FIG. 1C illustrates an SL communication scenario in a wireless communication system according to an embodiment.

FIG. 1C illustrates an example of an out-of coverage (OOC) scenario in which all terminals are located out of coverage of the BS.

Referring to FIG. 1C, the terminals (e.g., UE-1 and UE-2) cannot receive data and control information from the BS through the DL and cannot transmit data and control information to the BS through the UL. The terminals (e.g., UE-1 and UE-2) may transmit/receive data and control information through the SL.

Figure 1D:
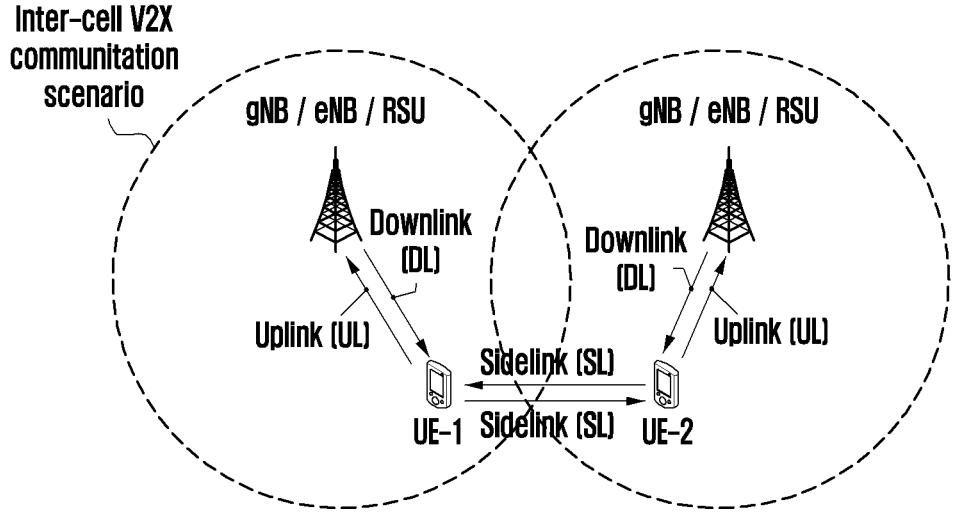
FIG. 1D illustrates an SL communication scenario in a wireless communication system according to an embodiment.

FIG. 1D illustrates an example of a scenario in which terminals (e.g., UE-1, UE-2) located in different cells perform SL communication.

Referring to FIG. 1D, the terminals (e.g., UE-1, UE-2) access different BSs (i.e., a radio resource control (RRC)-connected state) or camp on the BSs (i.e., RRC connection-released state or RRC idle state). In this case, a first terminal (e.g., UE-1) may be a transmission terminal, and a second terminal (e.g., UE-2) may be a reception terminal. Alternatively, the first terminal (e.g., UE-1) may be a reception terminal in the SL, and the second terminal (e.g., UE-2) may be a transmission terminal.

The first terminal (e.g., UE-1) may receive a system information block (SIB) from the BS which the first terminal accesses (or the first terminal camps on) and the second terminal (e.g., UE-2) may receive the SIB from another BS which the second terminal accesses (or the second terminal camps on). In this case, as the SIB, an existing SIB or a separately defined SIB for SL communication may be used. In addition, the SIB information that the first UE (e.g., UE-1) receives and the SIB information that the second terminal (e.g., UE-2) receives may be different from each other. Accordingly, for performing SL communication between the terminals (e.g., UE-1, UE-2) located in different cells, information may be unified or a method for interpreting SIB information transmitted from each other cell by signaling information on this may be additionally required.

Although FIGS. 1A to 1D illustrate an SL system including two terminals (e.g., UE-1 and UE-2) for convenience of description, the disclosure is not limited thereto and communication may be performed between more terminals. In addition, the interface (UL and DL) between the BS and the terminals may be referred to as a Uu interface, and the SL between the terminals may be referred to as a PC5 interface. Accordingly, the terms may be interchangeably used in the disclosure.

Herein, a terminal may refer to a general terminal and a terminal supporting V2X. For example, a terminal may refer to a handset of a pedestrian (e.g., a smartphone), or a terminal may include a vehicle supporting vehicular-to-vehicular (V2V) communication, a vehicle supporting vehicle-to-pedestrian (V2P) communication, a vehicle supporting Vehicle-to-Network (V2N) communication, or a vehicle supporting vehicle-to-infrastructure (V21) communication. Alternatively, a terminal may include a road side unit (RSU) having a terminal function, an RSU having a BS function, or an RSU having some of the BS functions and some of the terminal functions.

In addition, a BS may support both V2X communication and general cellular communication or only V2X communication. For example, the BS may be a 5G BS (gNB), a 4G BS (eNB), or an RSU. Accordingly, a BS may be referred to as an RSU.

Figure 2:
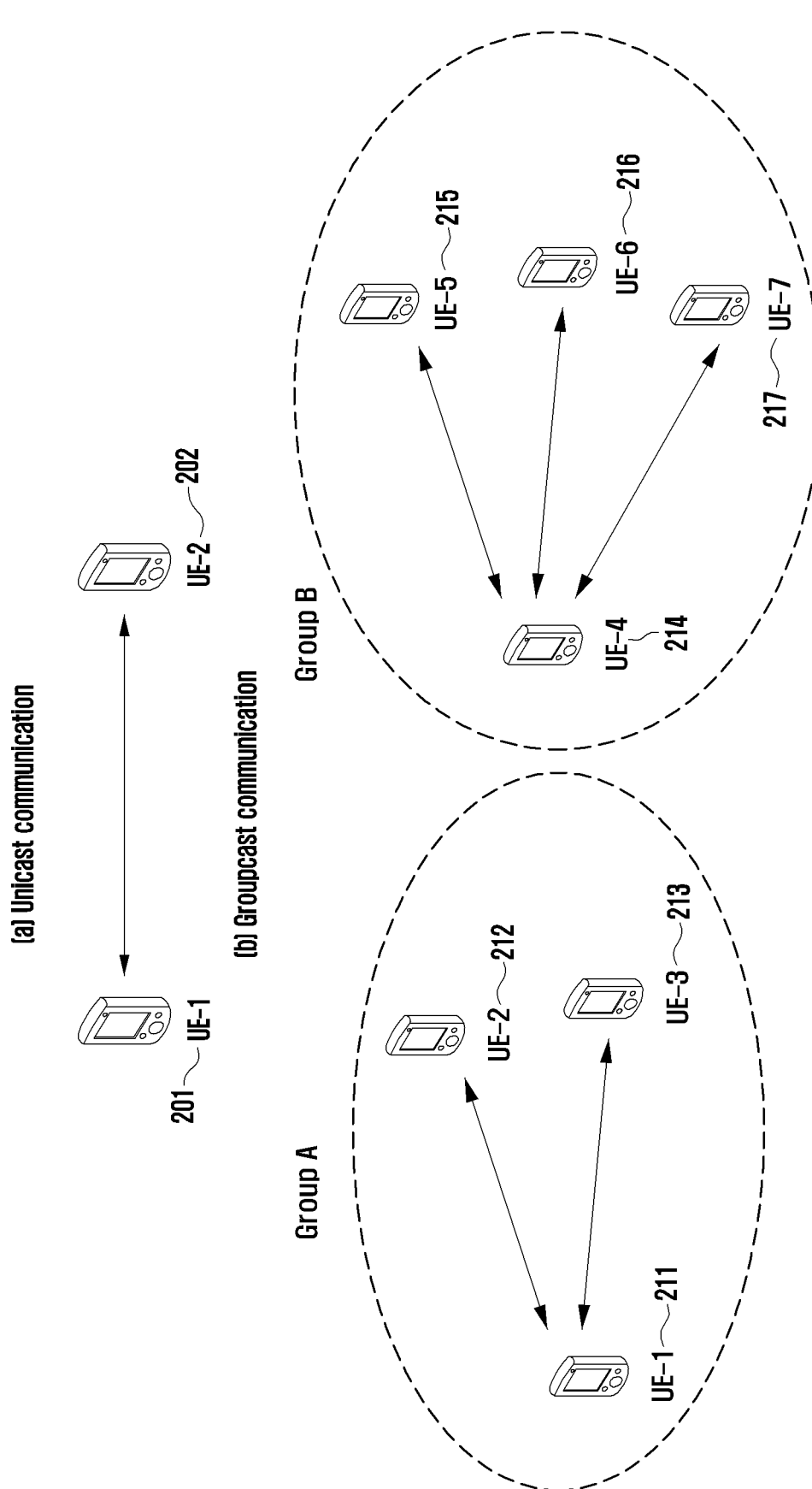
FIG. 2 illustrates a communication method performed through an SL according to an embodiment.

FIG. 2 illustrates a communication method performed through an SL according to an embodiment.

Referring to FIG. 2, for unicast communication, a UE-1 201 (e.g., a transmission (TX) UE) and a UE-2 202 (e.g., a reception (RX) UE) may communicate in a one-to-one manner. In the SL, capability information and configuration information can be exchanged between terminals through PC5-RRC defined in a unicast link between the terminals. In addition, configuration information may be exchanged through an SL medium access control control element (MAC CE) defined in a unicast link between the terminals.

For groupcast communication, a TX UE and an RX UE may communicate in a one-to-many manner. In (FIG. 2, UE-1 211, UE-2 212, and UE-3 213 may form one group (group A) and perform groupcast communication, and UE-4 214, UE-5 215, UE-6 216, and UE-7 217 may form another group (group B) and perform groupcast communication. Each UE may perform groupcast communication only within the group to which the UE belongs, and communication between different groups may be performed through unicast, groupcast, or broadcast communication. Although the groupcast communication in FIG. 2 illustrates that two groups (Group A and Group B) are formed, the scope of the disclosure is not limited thereto.

Although not illustrated in FIG. 2, the UEs may perform broadcast communication in an SL. For broadcast communication, all of the UEs receive data and control information transmitted by a transmission UE through the SL. For example, in FIG. 2, assuming that UE-1 211 is a TX UE for broadcast, UE-2 212, UE-3 213, UE-4 214, UE-5 215, UE-6 216, and UE-7 217 receive data and control information transmitted by UE-1 211.

In NR V2X, supporting a type in which a vehicle UE transmits data only to one specific node (or UE) through unicast and another type in which the vehicle UE transmits data to a plurality of specific nodes (or UEs) through groupcast may be considered, unlike in LTE V2X. For example, the unicast and groupcast technologies may be usefully used in a service scenario such as platooning, which is a technology in which two or more vehicles are connected through one network and move in a cluster form. Specifically, unicast communication may be used by a leader node in the group connected through platooning to control one specific node, and group cast communication may be used to simultaneously control groups including a plurality of specific nodes.

Figure 3:
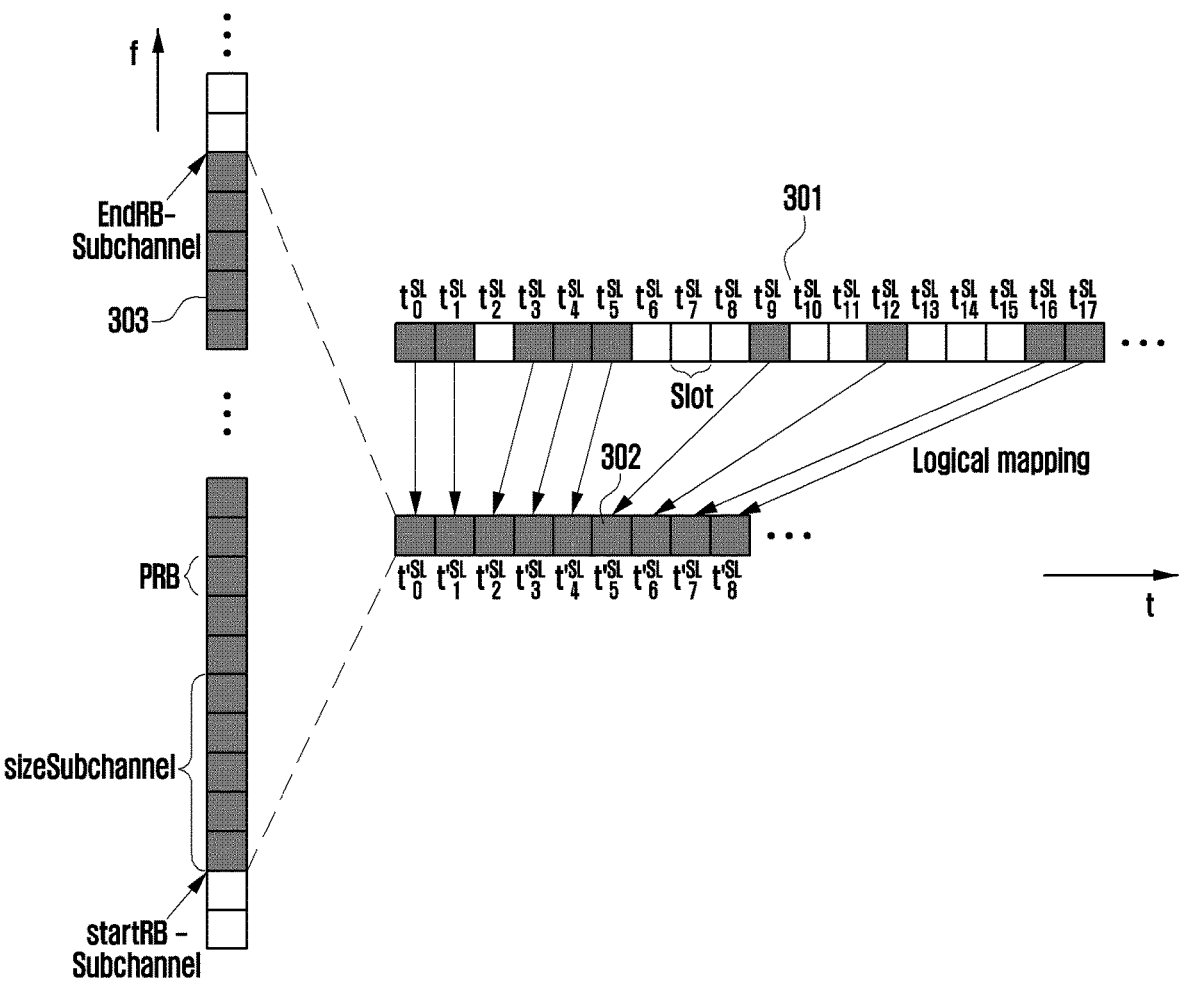
FIG. 3 illustrates a resource pool defined as a set of resources on time and frequency domains used for transmission and reception of an SL according to an embodiment.

FIG. 3 illustrates a resource pool defined as a set of resources on time and frequency domains used for transmission and reception of SLs according to an embodiment.

For example, a resource allocation unit (e.g., resource granularity) in the time axis within the resource pool may be one slot. A resource allocation unit in the frequency axis within the resource pool may be a sub-channel including one or more physical resource blocks (PRBs). Although the disclosure includes examples in which the resource pool is discontinuously allocated in the time axis, the resource pool may be continuously allocated in the time axis. In addition, although the disclosure includes examples in which the resource pool is continuously allocated in the frequency axis, the disclosure does not exclude a method in which the resource pool is discontinuously allocated in the frequency axis.

Referring to FIG. 3, a resource pool is discontinuously allocated on the time axis (301). A resource allocation unit (granularity) in the time axis may be a slot unit, and the SL slot may be defined in a slot used for UL. Specifically, the location and length of a symbol used as an SL in one slot may be configured as SL BWP information (e.g., SL-BWP-Generic). Accordingly, among the slots used for the UL, slots in which the length of the symbol configured as the SL is not guaranteed may not be the SL slots. In addition, slots belonging to the resource pool may be excluded from slots to which the SL synchronization signal block (S-SSB) is transmitted.

Referring to 301 in FIG. 3, a set of slots $$\left( t_0^{SL}, t_1^{SL}, t_3^{SL}, t_4^{SL}, t_5^{SL}, t_9^{SL}, t_{12}^{SL}, t_{16}^{SL}, t_{17}^{SL} \right)$$

that may be used as a SL on time domain except for the slots as described above may be determined. SL slots belonging to the resource pool may be (pre-) configured with resource pool information through a bitmap. With reference to 302 in FIG. 3, a set of SL slots belonging to the resource pool on time is logical mapped and illustrated as $$\left( t_0'^{SL}, t_1'^{SL}, t_2'^{SL}, \ldots \right).$$

Herein, a (pre-)configuration may refer to configuration information that is pre-configured in the UE and stored in advance, or may refer to when the UE is configured in a cell-common manner from the BS. The cell-common manner may include UEs in the cell receiving the same information configuration from the BS. In this case, a method for obtaining cell-common information by receiving an SL-SIB from the BS may be considered by the UE. In addition, it may include when the UE is configured in a UE-specific manner after the RRC connection with the BS is established.

Herein, UE-specific may be replaced with the term UE-dedicated, and may include when configuration information is received with a specific value for each UE. In this case, a method in which the UE receives an RRC message from the BS and obtains UE-specific information may be considered. In addition, (pre-)configuration may consider a method configured in the resource pool information and a method not configured in the resource pool information.

When (pre-)configuration is configured in the resource pool information, except for when the UE is configured in a UE-specific manner, after the RRC connection with the BS is established, all UEs operating in the corresponding resource pool may operate with common configuration information. However, the method in which (pre-)configuration is not configured in the resource pool information is basically configured independently of the resource pool configuration information. For example, one or more modes may be (pre-)configured in a resource pool (e.g., A, B, and C), and the (pre-)configured information independently of the resource pool configuration information may indicate which mode (e.g., A, B, or C) to use among (pre-)configured modes in the resource pool. In addition, in SL unicast transmission, (pre-)configuration may be configured through PC5-RRC.

Alternatively, a method in which (pre-)configuration is configured through MAC-CE may also be considered. In the disclosure, a (pre-)configuration may be applied to all of the above-described cases.

Referring to 303 in FIG. 3, the resource pool may be continuously allocated on the frequency axis. For example, on the frequency axis, resource allocation may be configured with SL BWP information and may be performed in units of sub-channels. The sub-channel may be defined as a resource granularity on the frequency axis including one or more PRBs. That is, the sub-channel may be defined as an integer multiple of the PRB. In 303, the sub-channel includes five consecutive PRBs, and a sub-channel size (sizeSubchannel) is the size of five consecutive PRBs. However, FIG. 3 is only an example of the disclosure, and the size of the sub-channel may be configured to be different, and one sub-channel is generally constituted as a continuous PRB, but is not necessarily configured as a continuous PRB. The sub-channel may be a basic unit of resource allocation for a PSSCH.

When resource allocation on the frequency axis is performed in units of sub-channels, resources on the frequency axis may be allocated according to a resource block (RB) index indicating a start location of a sub-channel in a resource pool (e.g., startRB-Subchannel), information on the number of PRBs in one sub-channel (e.g., sizeSubchannel), configuration information on the total number of sub-channels (e.g., numSubchannel), etc. In this case, information on startRB-Subchannel, sizeSubchannel, and numSubchannel may be (pre-)configurated in frequency domain resource pool information.

A method of allocating transmission resources in an SL includes receiving SL transmission resources from a BS when a terminal is within the coverage of the BS. Hereinafter, this method is referred to as Mode 1. In other words, Mode 1 may be a method, performed by a BS, of allocating resources used for SL transmission to RRC-connected terminals in a dedicated scheduling scheme. Mode 1 allows a BS to manage resources of an SL, and is effective in interference management and resource pool management.

Alternatively, methods of allocating transmission resources in an SL include allocating transmission resources through direct sensing by a terminal in an SL. Hereinafter, this method is referred to as Mode 2. Mode 2 may also be referred to as UE autonomous resource selection. Unlike Mode 1 in which a BS directly participates in resource allocation, in Mode 2, a transmission terminal autonomously selects resources through a sensing and resource selection procedure defined based on a (pre-)configured resource pool, and transmits data through the selected resources.

When transmission resources are allocated through Mode1 or Mode2, the terminal may transmit/receive data and control information through an SL. Here, the control information may include SL control information (SCI) format 1-A as first-stage SCI transmitted through a physical SL control channel (PSCCH). In addition, the control information may include at least one of SCI format 2-A and SCI format 2-B, as a second-stage SCI transmitted through a PSSCH.

Next, a method is described for using a PRS transmitted through a DL and UL of a terminal and a BS, for positioning to measure a location of the terminal. In the disclosure, the positioning method using a positioning signal transmitted through a DL and UL of a terminal and BS may be referred to as radio access technology (RAT)-dependent positioning. In addition, other positioning methods may be classified as RAT-independent positioning. Specifically, in case of an LTE system, as a RAT-dependent positioning scheme, methods such as observed time difference of arrival (OTDOA), UL time difference of arrival (UTDOA), and enhanced cell identification (E-CID) may be used. In case of an NR system, methods such as DL time difference of arrival (DL-TDOA), DL angle-of-departure (DL-AOD), multi-RTT, NR E-CID, UL time difference of arrival (UL-TDOA), and UL angle-of-arrival (UL-AOA) may be used. On the other hand, RAT-independent positioning schemes may include assisted global navigation satellite systems (A-GNSS), a sensor, a wireless local area network (WLAN), and Bluetooth®, The disclosure provides RAT-dependent positioning methods supported through an SL. In the case of an interface between a BS and terminals (UL and DL, hereinafter referred to as Uu), RAT-dependent positioning is available when a terminal is within the coverage of a BS. However, it is noted that the RAT-dependent positioning of the SL may not be limited to when a terminal is within the coverage of a BS. In the case of the RAT-dependent positioning in Uu, positioning protocols such as LTE positioning protocol (LPP), LTE positioning protocol annex (LPPa), and NR positioning protocol annex (NRPPa) may be used. LPP is considered as a positioning protocol defined between a terminal and an LS, and LPPa and NRPPa are considered as protocols defined between a BS and an LS. Here, the LS is an entity that manages location measurement and may perform a location management function (LMF). In addition, the LS may be referred to as an LMF or other names. In both LTE and NR systems, LPP is supported, and the following roles for positioning may be performed through LPP.

Positioning capability exchange,

Assistance data transmission,

Location information transmission,

Error handling, and

Abort.

A terminal and an LS may perform the above roles through LPP. A BS may allow the terminal and the LS to exchange positioning information. For example, the BS may deliver/forward positioning-related configuration information indicated by the LS to the terminal. The exchange of positioning information through LPP may be performed transparently. That is, the BS is not involved in configuring the positioning information when the terminal and the LS server exchange positioning information (the BS performs an operation of only forwarding/delivering positioning (configuration) information configured by the LS to the terminal).

During a positioning capability exchange, the terminal may exchange supportable positioning information with the LS. For example, information on whether the positioning method supported by the terminal is UE-assisted, UE-based, or both are available may be exchanged with the LS. UE-assisted positioning is a scheme in which the terminal transmits only a measured value for a positioning scheme to the LS based on a received positioning signal, without directly measuring the absolute position of the terminal, and the absolute position of the terminal is calculated by the LS. The absolute position may refer to two-dimensional (x,y) and three-dimensional (x,y,z) coordinate position information of the terminal based on longitude and latitude. On the other hand, UE-based positioning may be a scheme in which the terminal may directly measure the absolute position of the terminal, and for this, the terminal should receive a positioning signal, together with position information of the source of the positioning signal.

While LTE systems support only UE-assisted schemes, NR systems may support both UE-assisted and UE-based positioning.

Assistance data transmission may be an important factor in positioning, e.g., to accurately measure the location of the terminal. Specifically, in the case of assistance data transmission, the LS may provide the terminal with configuration information about the positioning signal, information about candidate cells and transmission reception points (TRPs) to receive the positioning signal, etc. When DL-TDOA is used, the information about the candidate cells and TRPs to receive the positioning signal may include information about reference cells, reference TRPs, neighbor cells, and neighbor TRPs. In addition, a plurality of candidates for neighbor cells and neighbor TRPs may be provided, together with information about which cell and TRP the UE should select to measure the positioning signal.

In order for the terminal to accurately measure the location, it is important to properly select information about candidate cells and TRPs to be used as a reference. For example, when a channel for a positioning signal received from a corresponding candidate cell and TRP is a line-of-sight (LOS) channel, i.e., a channel having fewer non-LOS (NLOS) channel components, the accuracy of positioning measurement may increase. Therefore, when the LS provides the terminal with information about candidate cells and TRPs, which are the reference for performing positioning by collecting various pieces of information, the terminal may perform more accurate positioning measurement.

Location information transmission may be performed through LPP. The LS may request location information from the terminal, and the terminal may provide measured location information to the LS in response to the request.

In UE-assisted positioning, the corresponding location information may be a measured value with respect to a positioning scheme based on a received positioning signal. On the other hand, in UE-based positioning, the corresponding location information may be two-dimensional (x,y) and three-dimensional (x,y,z) coordinate position values of the terminal. When the LS requests the location information from the terminal, the LS may include required accuracy, response time, etc., in positioning quality-of-service (QoS) information and request the location information. When the corresponding positioning QoS information is requested, the terminal should provide the LS with the measured location information to satisfy the corresponding accuracy and response time, and, when it is impossible to satisfy the QoS, the terminal may consider error handling and/or aborting. However, this is only an example, and error handling and aborting may be performed on positioning in other cases than those in which it is impossible to satisfy QoS.

A positioning protocol defined between the BS and the LS is referred to as LPPa in LTE systems, and the following functions may be performed between the BS and the LS.

E-CID location information transmission,
OTDOA information transmission,
General error state reporting, and
Assistance information transmission.

A positioning protocol defined between the BS and the LS is referred to as NRPPa in NR systems, and includes the roles performed by LPPa, and the following functions may be additionally performed between the BS and the LS.

Positioning information transmission,
Measurement information transmission, and
TRP information transmission.

Unlike in LTE systems, in NR systems, more positioning techniques are supported. Accordingly, various positioning schemes may be supported through the positioning information transmission.

For example, positioning measurement may be performed by a BS through a positioning sounding reference signal (SRS) transmitted by a terminal. Therefore, information related to configuration and activation/deactivation of a positioning SRS may be exchanged between the BS and the LS as the positioning information. The measurement information transmission may be a function of exchanging, between the BS and the LS, information related to multi-RTT, UL-TDOA, and UL-AOA, which are not supported in LTE systems. The TRP information transmission may include exchanging information related to performing of TRP-based positioning, because TRP-based positioning may be performed in NR systems whereas cell-based positioning is performed in LTE systems.

Entities performing positioning-related configuration and entities calculating positioning for measuring a location of a terminal in an SL may be classified into the following three types:

UE (no LS),
LS (through BS), or
LS (through UE).

In the above, a BS may include a gNB or eNB, and UE denotes a terminal performing transmission and reception through an SL. For example, as described above, the terminal performing transmission and reception through an SL may be a vehicle terminal or a pedestrian terminal. In addition, the terminal performing transmission and reception through an SL may include an RSU having terminal functions, an RSU having BS functions, or an RSU having some of BS functions and some of terminal functions.

In addition, the terminal performing transmission and reception through an SL may include a positioning reference unit (PRU), the location of which is known.

The UE (no LS) may refer to an SL terminal not connected to the LS. LS (through BS) denotes an LS connected to a BS. LS (through UE) denotes an LS connected to the SL terminal. In other words, LS (through UE) may indicate a case where LS is available, even when the terminal is not within the coverage of the BS. Here, LS (through UE) may be available only to certain terminals, such as an RSU or a PRU, other than general terminals. In addition, a terminal connected to the LS through an SL may be defined as a new type of device. In addition, only a particular terminal supporting UE capability connected to the LS may perform a function of connecting to the LS through a SL.

In Table 1 below, Cases 1 to 9 indicate various combinations of an entity that performs positioning-related configuration and an entity that calculates positioning for measuring a location of a terminal on an SL. A terminal on which location measurement is to be performed is referred to as a target terminal. In addition, a terminal, the location of which is known and which is able to provide positioning signal for measuring the location of the target terminal, is referred to as a positioning reference (PosRef) terminal. Therefore, the PosRef terminal may have its own location information and may provide the location information of the terminal together with the S-PRS. In other words, the location of the PosRef terminal is already known. Herein, the terms target terminal and PosRef terminal are only examples for convenience of description, do not limit the technical scope of the disclosure, and may be replaced with other terms. For example, a PosRef terminal may also be referred to as an anchor terminal.

The positioning configuration may be classified into UE-configured and network-configured schemes. In Table 1, in cases in which positioning configuration is UE (no LS), a UE-configured scheme may be applied. The UE-configured scheme is advantageous in that positioning configuration may be performed even in the case where the terminal is not within the network (BS) coverage.

In Table 1, in cases in which positioning configuration is LS (through BS), a network-configured scheme may be applied. In the network-configured scheme, in the case where a terminal is in the network coverage, positioning calculation and measurement information is reported to a BS and then measurement of the location of a target UE is performed by an LS connected to the BS. Thus, delay may occur due to signaling related to the location measurement, but more accurate location measurement may be possible.

In Table 1, cases in which positioning configuration is LS (through UE) may not correspond to the network-configured scheme, because the terminal is not configured within the network coverage through the BS. In addition, in the case where the LS connected to the terminal provides configurations, but it is not classified as configured by the terminal, it may not correspond to the UE-configured method. However, in the case where it is classified as configured by the terminal, it may correspond to the UE-configured scheme. Accordingly, in the case of LS (through UE), it may be named in a scheme other than the UE-configured or network-configured scheme.

The positioning calculation may be classified into two schemes, i.e., UE-assisted and UE-based schemes, as described above. In Table 1, cases in which positioning calculation is UE (no LS) may correspond to the UE-based scheme, and cases in which positioning calculation is LS (through BS) or LS (through UE) may generally correspond to the UE-assisted scheme. However, in cases in which positioning calculation is LS (through UE) and the corresponding LS is interpreted as the terminal, LS (through UE) may also correspond to the UE-based scheme.

TABLE 1

| | Positioning configuration | Positioning calculation |
|---|---|---|
| Case 1 | UE (no LS) | UE (no LS) |
| Case 2 | UE (no LS) | LS (through BS) |
| Case 3 | UE (no LS) | LS (through UE) |
| Case 4 | LS (through BS) | UE (no LS) |
| Case 5 | LS (through BS) | LS (through BS) |
| Case 6 | LS (through BS) | LS (through UE) |
| Case 7 | LS (through UE) | UE (no LS) |
| Case 8 | LS (through UE) | LS (through BS) |
| Case 9 | LS (through UE) | LS (through UE) |

In Table 1, positioning configuration information may include S-PRS configuration information. The S-PRS configuration information may be pattern information of an S-PRS and/or information related to a time/frequency transmission location. In addition, the positioning calculation may be performed by the terminal receiving an S-PRS and performing measurement from the received S-PRS, and the positioning measurement and calculation method may vary depending on which positioning method is applied. Measurement of location information in an SL may be absolute positioning to provide two-dimensional (x,y) and three-dimensional (x,y,z) coordinate position values of a terminal, or relative positioning to provide relative two-dimensional or three-dimensional position information from another terminal. In addition, the location information in the SL may be ranging information including one of the distance and direction from another terminal. When the ranging in the SL includes both distance and direction information, ranging may have the same meaning as that of relative positioning. Also, as a positioning method, an SL time difference of arrival (SL-TDOA), SL angle-of-departure (SL-AOD), SL Multi-RTT, SL RTT, SL angle-of-arrival (SL-AOA), etc., may be considered.

Figure 4:
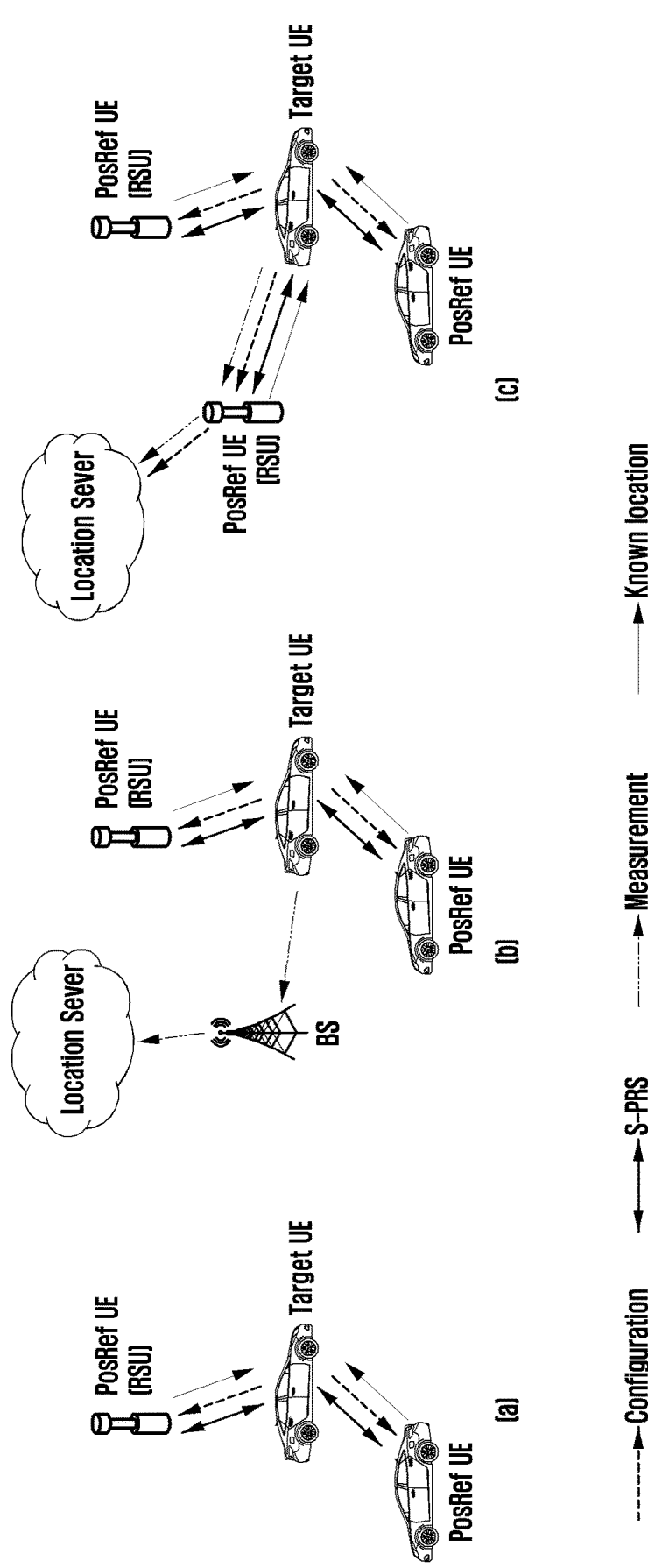
FIG. 4 illustrates calculating a location of a terminal through an SL according to an embodiment.
Figure 5:
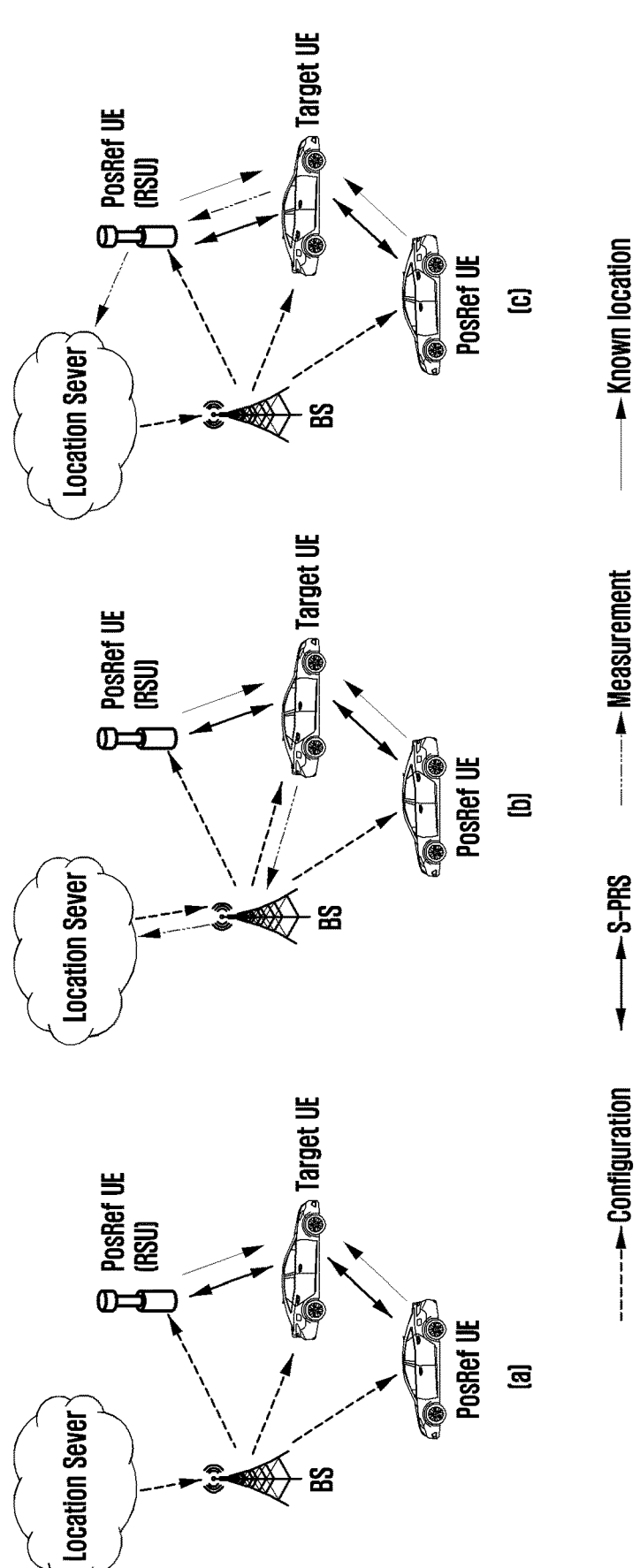
FIG. 5 illustrates calculating a location of a terminal through an SL according to an embodiment.
Figure 6:
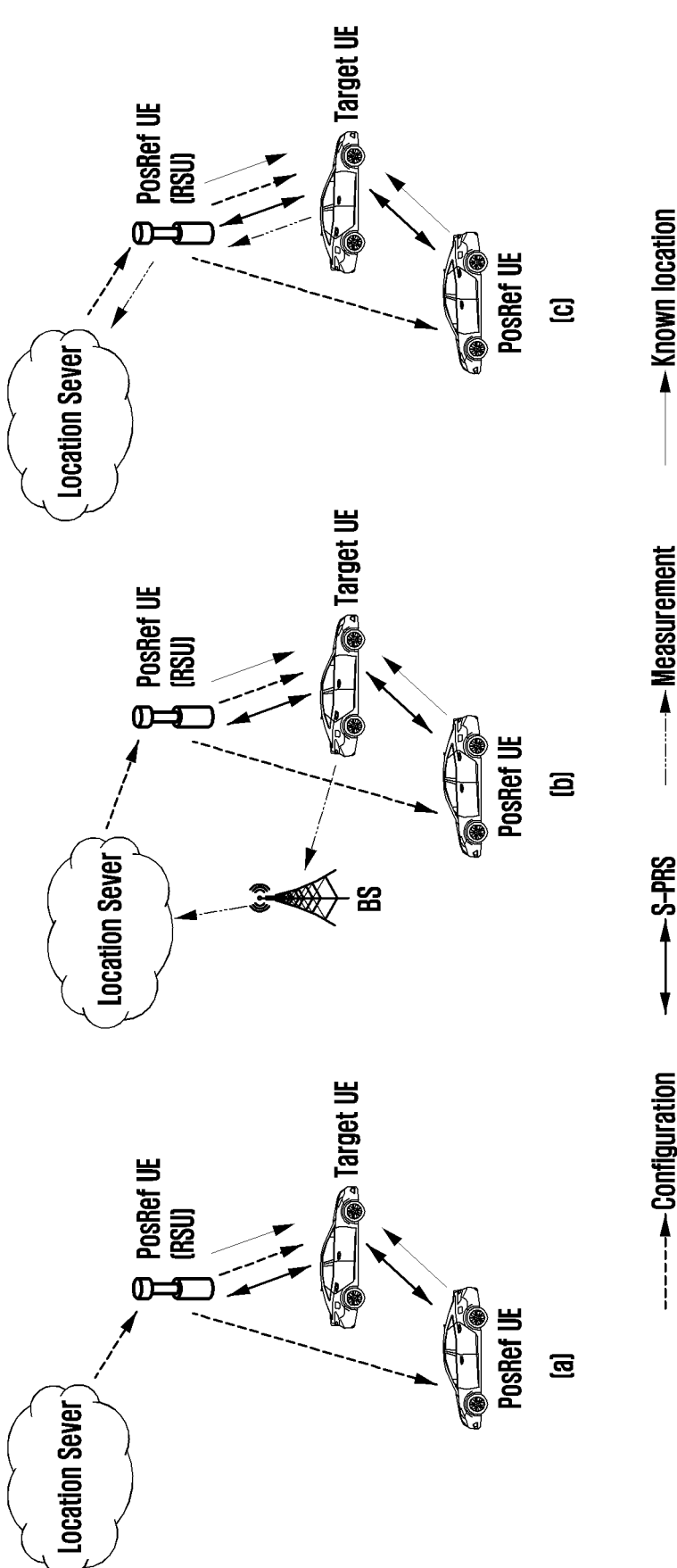
FIG. 6 illustrates calculating a location of a terminal through an SL according to an embodiment.

FIGS. 4 to 6 illustrate calculating locations of terminals through SLs according to embodiments. However, in the disclosure, calculating the location of the terminal through the SL is not limited to the examples illustrated in FIGS. 4 to 6.

In FIGS. 4 to 6, 'configuration' represents signaling of positioning configuration information. 'S-PRS' indicates transmission of S-PRS, and in the case of S-PRS transmission, it may be performed in both directions or in one direction. 'Measurement' indicates the transmission of measured information or measured positioning information for positioning. 'Known location' indicates the transmission of location information (known location) known by the terminal.

Referring to FIG. 4, (a) illustrates an example in which an SL terminal not connected to an LS provides positioning configuration and a target terminal not connected to the LS performs positioning calculation. This may correspond to Case 1 of Table 1. In this case, the target terminal may broadcast, unicast, or group cast an indication of positioning-related configuration information to another terminal through an SL. In addition, the target terminal may perform positioning calculation based on the provided positioning signal.

In FIG. 4, (b) illustrates an example in which an SL terminal not connected to an LS provides positioning configuration, a target terminal is located within network coverage, and thus, the LS connected to a BS performs positioning calculation. This may correspond to Case 2 of Table 1.

In this case, the target terminal may broadcast, unicast, or group cast an indication of positioning-related configuration information to another terminal through an SL. In addition, the target terminal performs positioning measurement based on the provided configuration information, and reports measured positioning information to the BS because the target terminal is within the coverage of the BS. Then, corresponding measurement information may be reported to the LS connected to the BS, and thus the LS may perform positioning calculation.

In FIG. 4, (c) illustrates an example in which an SL terminal not connected to an LS provides positioning configuration and the LS performs positioning calculation through a SL terminal connected to the LS. This may correspond to Case 3 of Table 1.

In this case, the target terminal may broadcast, unicast, or group cast an indication of positioning-related configuration information to another terminal through an SL. In addition, the target terminal performs positioning measurement based on the provided positioning signal, and reports measured positioning information to a terminal connected to the LS because the target terminal is within SL coverage with the terminal connected to the LS. In (c), the terminal connected to the LS is illustrated as an PosRef UE (RSU), but it is noted that the terminal may be a terminal other than the RSU. Then, corresponding measurement information may be reported to the LS connected to the PosRef UE(RSU), and thus the LS may perform positioning calculation based on this.

Referring to FIG. 5, (a) illustrates an example in which an SL terminal is located within network coverage, an LS connected to a BS provides positioning configuration, and a target terminal not connected to the LS performs positioning calculation. This may correspond to Case 4 of Table 1.

In this case, positioning configuration information may be provided by the LS connected to the BS using a positioning protocol such as LPP. In addition, the target terminal may perform positioning calculation based on the provided configuration information and positioning signal.

In FIG. 5, (b) illustrates an example in which a SL terminal is located within network coverage, an LS connected to a BS provides positioning configuration, a target terminal is located within the network coverage, and the LS connected to the BS performs positioning calculation. This may correspond to Case 5 in Table 1.

In this case, positioning configuration information may be provided by the LS connected to the BS using a positioning protocol such as LPP. In addition, the target terminal may perform positioning measurement based on the provided configuration information and positioning signal, and may report measured positioning information to the BS because the target terminal is within the coverage of the BS. Then, corresponding measurement information may be reported to the LS connected to the BS, and thus the LS may perform positioning calculation based on the measurement information.

In FIG. 5, (c) illustrates an example in which an SL terminal is located within network coverage, an LS connected to a BS provides positioning configuration, and the LS performs positioning calculation through a SL terminal connected to the LS. This may correspond to Case 6 in Table 1.

In this case, positioning configuration information may be provided by the LS connected to the BS using a positioning protocol such as LPP. In addition, the target terminal may perform positioning measurement based on the provided configuration information and positioning signal, and may report measured positioning information to a terminal connected to the LS because the target terminal is within SL coverage with the terminal connected to the LS. In (c), the terminal connected to the LS is illustrated as a PosRef UE (RSU), but the terminal may be a terminal other than the RSU. Then, corresponding measurement information may be reported to the LS connected to the PosRef UE (RSU), and thus the LS may perform positioning calculation based on the reported measurement information.

Referring to FIG. 6, (a) illustrates an example in which an LS provides positioning configuration through an SL terminal connected to the LS, and a target terminal not connected to the LS performs positioning calculation. This may correspond to Case 7 in Table 1.

In this case, positioning configuration information may be provided by the LS connected to the terminal using a positioning protocol such as LPP. In addition, the target terminal may perform positioning calculation based on the provided configuration information and positioning signal.

In FIG. 6, (b) illustrates an example in which an LS provides positioning configuration through a SL terminal connected to the LS, a target terminal is located within network coverage, and the LS connected to a BS performs positioning calculation. This may correspond to Case 8 in Table 1.

In this case, positioning configuration information may be provided by the LS connected to the terminal using a positioning protocol such as LPP. In addition, the target terminal may perform positioning measurement based on the provided configuration information and positioning signal, and may report measured positioning information to the BS because the target terminal is within the coverage of the BS. Corresponding measurement information may be reported to the LS connected to the BS, and thus, the LS may perform positioning calculation based on the measurement information.

In FIG. 6, (c) illustrates an example in which an LS provides positioning configuration through an SL terminal connected to the LS, and the LS performs positioning calculation through the SL terminal connected to the LS. This may correspond to Case 9 in Table 1.

In this case, positioning configuration information may be provided by the LS connected to the terminal using a positioning protocol such as LPP. In addition, the target terminal may perform positioning measurement based on the provided configuration information and positioning signal, and may report measured positioning information to a terminal connected to an LS because the target terminal is within SL coverage with the terminal connected to the LS. In (c), the terminal connected to the LS is illustrated as a PosRef UE (RSU), but the terminal may be a terminal other than the RSU. Then, corresponding measurement information may be reported to the LS connected to the PosRef UE (RSU), and thus, the LS may perform positioning calculation based on the reported measurement information.

Figure 7:
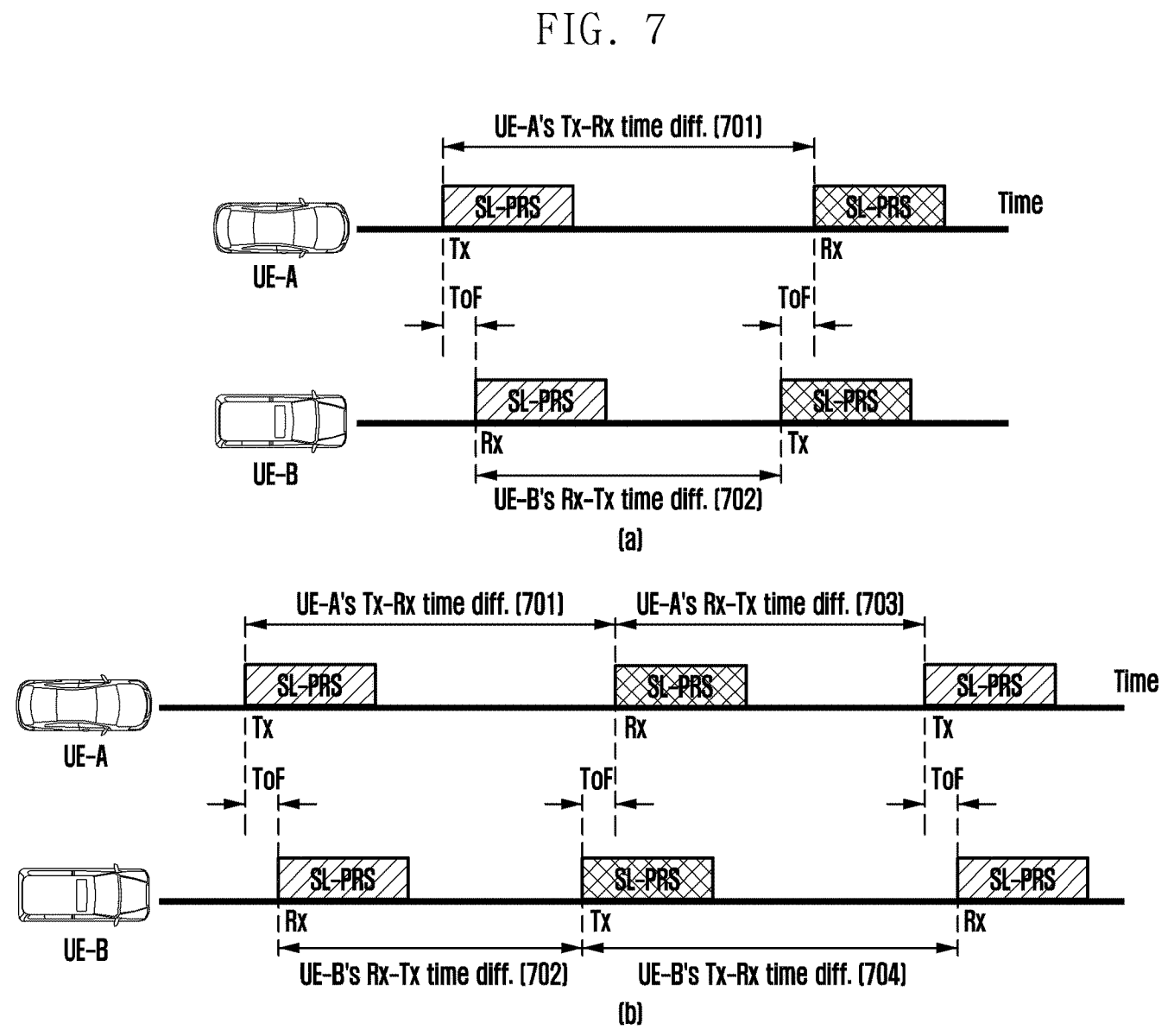

FIG. 7 illustrates performing positioning using an RTT scheme according to an embodiment.

Referring to FIG. 7, UE-A and UE-B may correspond to a target terminal and a PosRef terminal, respectively. However, in FIG. 7, UE-A and UE-B are not limited to Target UE and PosRef UE, respectively. In other words, UE-A may correspond to a PosRef terminal and UE-B may correspond to a target terminal.

In FIG. 7, a method for performing RTT (single RTT) with one pair between a target terminal and one PosRef terminal is illustrated. However, the target terminal may perform RTT with a plurality of PosRef terminals. In this case, unlike FIG. 7, a plurality of pairs between the target terminal and one PosRef terminal may exist, and this method may be named multi-RTT. multi-RTT may be used for the target terminal to perform absolute positioning. Time of flight (ToF) may be calculated using the RTT method, and distance may be measured using the relational formula of 'speed=time/distance' or 'distance=speed x time' or 'time=distance/speed'. Here, ToF means time, and the speed of light may be applied as the speed.

In FIG. 7, (a) illustrates a single sided RTT method (or a unidirectional RTT method) in which RTT measurement may be performed by transmitting a positioning signal from UE-A to UE-B and from UE-B to UE-A. Specifically, UE-A may calculate a time difference $T_{round}$ 701 between the time it transmits a positioning signal to UE-B and the time it receives a positioning signal from UE-B. UE-B may calculate a time difference $T_{reply}$ 702 between the time it receives a positioning signal from UE-A and the time it transmits a positioning signal to UE-A. From this, ToF may be calculated as shown in Equation (1) below.

$$ToF = 1/2(T_{round} - T_{reply}) \qquad (1)$$

In order to calculate Equation (1) by UE-A, $T_{reply}$ information calculated by UE-B should be indicated to UE-A. However, in order to calculate Equation (1) by UE-B, $T_{round}$ information calculated by UE-A should be indicated to UE-B.

In FIG. 7, (b) illustrates a double sided RTT scheme in which UE-A transmits a positioning signal to UE-B, UE-B transmits a positioning signal to UE-A, and then UE-A again transmits a positioning signal to UE-B, so that RTT measurements may be performed. Specifically, UE-A may calculate a time difference $T_{round1}$ 701 between the time it transmits a positioning signal to UE-B and the time it receives a positioning signal from UE-B. UE-B may calculate a time difference $T_{reply1}$ 702 between the time it receives a positioning signal from UE-A and the time it transmits a positioning signal to UE-A. From this, UE-A may calculate $T_{reply2}$ 703, a time difference between the time it receives a positioning signal from UE-B and the time it transmits a second positioning signal to UE-B. UE-B may calculate a time difference $T_{round2}$ 704 between the time it transmits a positioning signal to UE-A and the time it receives a second positioning signal from UE-A. From this, ToF may be calculated as shown in Equation (2) below.

$$ToF = \qquad (2)$$

$$(T_{round1} \times T_{round2} - T_{reply1} \times T_{reply2})/(T_{round1} + T_{round2} + T_{reply1} + T_{reply2})$$

In order to calculate Equation (2) by UE-A, the $T_{reply1}$ and $T_{round2}$ information calculated by UE-B should be indicated to UE-A. However, in order to calculate Equation (2) by UE-B, $T_{round1}$ and $T_{reply2}$ information calculated by UE-A should be indicated to UE-B.

Compared to the single sided RTT according to Equation (1), in the double sided RTT according to Equation (2), the effect of clock drift in each terminal is minimized, so that there is an advantage of improving positioning accuracy. However, additional signal exchange may occur, resulting in additional delay in calculating ToF. In the disclosure, the RTT method is not limited to the two methods described above. For example, ToF may be calculated by additionally calculating $T_{reply}$ and $T_{round}$ through additional positioning signal exchange after $T_{reply2}$ and $T_{round2}$.

In the disclosure, one or more of the following embodiments may be used in combination with each other. A terminal capable of providing a positioning signal for location measurement of a target terminal may be referred to as a PosRef (Positioning Reference) terminal. The location of the PosRef terminal may be already known (known location) or may not be known (unknown location). When the location of the PosRef terminal is known, the corresponding location information may be delivered to the target terminal, and the target terminal may perform positioning based on UE-based. Although the disclosure includes a congestion control method for positioning signal transmission, the methods may be applied to other signal transmission methods as well as positioning signals.

First Embodiment

A first embodiment provides a method for configuring and transmitting a signal for a terminal to measure a location through an SL.

Whether the terminal is able to perform positioning through the SL, i.e., whether the terminal is capable of performing a positioning operation, may be determined by UE capability, and corresponding capability information may be transmitted to other terminals and a BS. In this case, whether the terminal is capable of performing positioning through the SL may also be determined by whether an SL positioning signal is transmitted/received. In this case, the SL positioning signal may be an S-PRS to be transmitted and received for positioning measurement. For example, a certain SL terminal may be capable of both transmitting and receiving an S-PRS. In addition, a certain SL terminal may be capable of transmitting an S-PRS, but incapable of receiving an S-PRS. In addition, a certain SL terminal may be capable of receiving an S-PRS, but incapable of transmitting an S-PRS. In addition, a certain SL terminal may be incapable of transmitting and receiving an S-PRS. Whether a terminal is capable of transmitting/receiving an S-PRS may be defined by UE capability.

Herein, an S-PRS signal is not limited to a specific signal. For example, a corresponding signal may be an SL synchronization signal or another reference signal defined in the SL. Alternatively, an S-PRS may be a newly defined reference signal for SL positioning.

Figure 8:
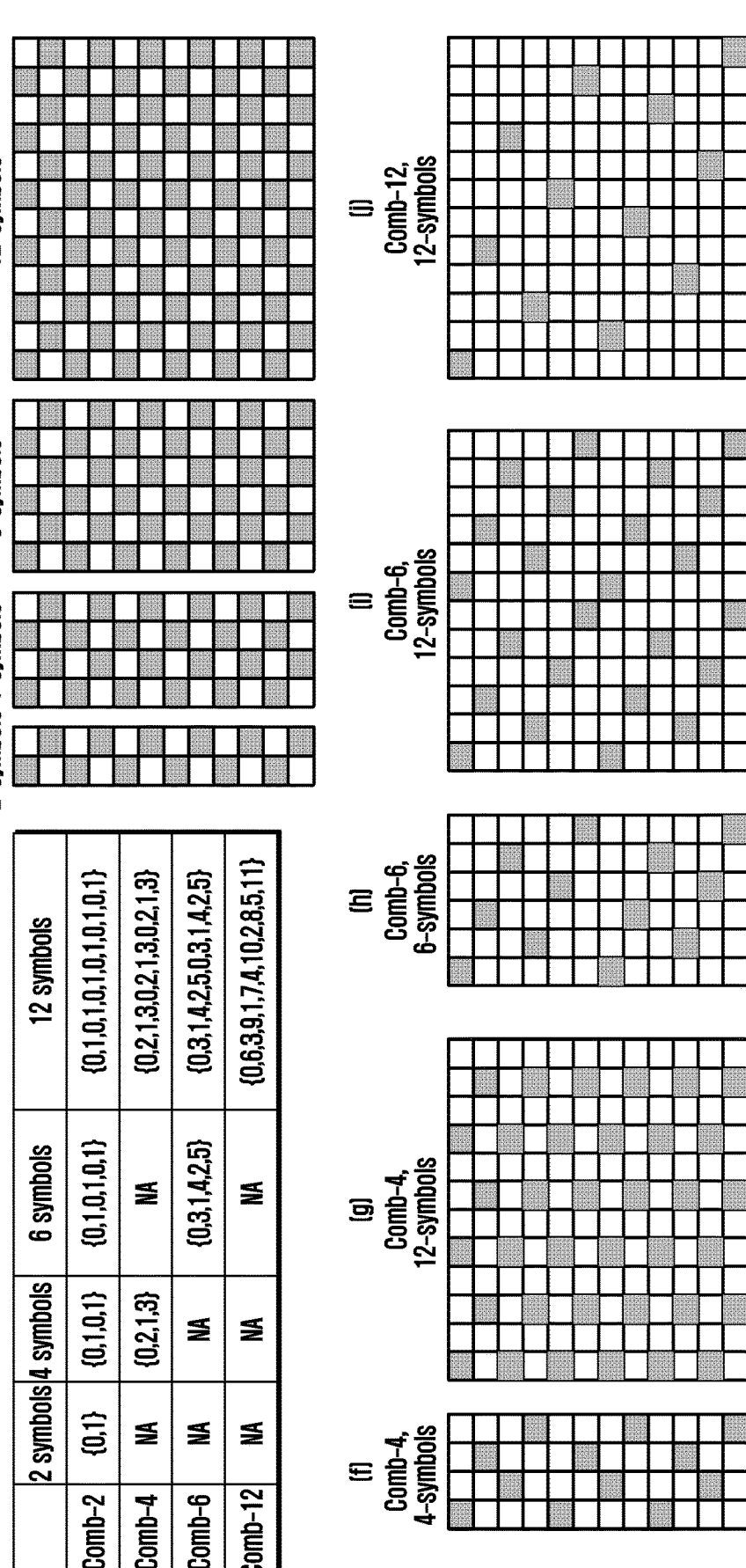
FIG. 8 illustrates a pattern of an SL PRS (S-PRS), based on a downlink (DL) PRS according to an embodiment.

FIG. 8 illustrates a pattern of an S-PRS, based on a DL PRS according to an embodiment. It is noted that the S-PRS illustrated in FIG. 8 may not be transmitted in frequency division multiplexing (FDM) with other SL channels and signals. This method avoids interference with other channels and signals by allowing only the S-PRS to be transmitted in a symbol in which the S-PRS is transmitted. Through this, it may guarantee the accuracy of positioning.

Referring to FIG. 8, a pattern based on a DL PRS may be reused for an S-PRS. In (a) in FIG. 8, the comb pattern and number of PRS symbols supported in a DL PRS may also be applied to an S-PRS. Specifically, an S-PRS pattern in the case of Comb-2 and the number of PRS symbols=2 is illustrated in (b) in FIG. 8. An S-PRS pattern in the case of Comb-2 and the number of PRS symbols=4 is illustrated in (c) in FIG. 8. An S-PRS pattern in the case of Comb-2 and the number of PRS symbols=6 is illustrated in (d) in FIG. 8. An S-PRS pattern in the case of Comb-2 and the number of PRS symbols=12 is illustrated in (e) in FIG. 8. An S-PRS pattern in the case of Comb-4 and the number of PRS symbols=4 is illustrated in (f) in FIG. 8. An S-PRS pattern in the case of Comb-4 and the number of PRS symbols=12 is illustrated in (g) in FIG. 8. An S-PRS pattern in the case of Comb-6 and the number of PRS symbols=6 is illustrated in (h) in FIG. 8. An S-PRS pattern in the case of Comb-6 and the number of PRS symbols=12 is illustrated in (i) in FIG. 8. An S-PRS pattern in the case of Comb-12 and the number of PRS symbols=12 is illustrated in (j) in FIG. 8.

According to FIG. 8, an S-PRS may have various symbol lengths, and the start position and length of a symbol through which an S-PRS is transmitted may be flexibly determined in a slot.

FIG. 9 is a diagram for explaining a pattern of an S-PRS, which is a SL positioning signal, based on a UL PRS according to an embodiment of the disclosure. It is noted that the S-PRS illustrated in FIG. 9 may not be transmitted in FDM with other SL channels and signals. This is a method for avoiding interference with other channels and signals by allowing only the S-PRS to be transmitted in a symbol in which the S-PRS is transmitted. Through this, it may guarantee accuracy of positioning.

Referring to FIG. 9, a pattern based on a UL SRS for positioning may be reused for explaining S-PRS.

In (a) in FIG. 9, a comb pattern and number of SRS symbols supported in UL SRS for positioning may be applied to an S-PRS. Specifically, an S-PRS pattern in the case of Comb-2 and the number of PRS symbols=1 is illustrated in (b) in FIG. 9. An S-PRS pattern in the case of Comb-2 and the number of PRS symbols=2 is illustrated in (c) in FIG. 9. An S-PRS pattern in the case of Comb-2 and the number of PRS symbols=4 is illustrated in (d) in FIG. 9. An S-PRS pattern in the case of Comb-4 and the number of PRS symbols=2 is illustrated in (e) in FIG. 9. An S-PRS pattern in the case of Comb-4 and the number of PRS symbols=4 is illustrated in (f) in FIG. 9. An S-PRS pattern in the case of Comb-4 and the number of PRS symbols=8 is illustrated in (g) in FIG. 9. An S-PRS pattern in the case of Comb-4 and the number of PRS symbols=12 is illustrated in (h) in FIG. 9. An S-PRS pattern in the case of Comb-8 and the number of PRS symbols=4 is illustrated in (i) in FIG. 9. An S-PRS pattern in the case of Comb-8 and the number of PRS symbols=8 is illustrated in (j) in FIG. 9. An S-PRS pattern in the case of Comb-8 and the number of PRS symbols=12 is illustrated in (k) in FIG. 9.

According to FIG. 9, an S-PRS may have various symbol lengths, and the start position and length of a symbol through which an S-PRS is transmitted may be flexibly determined in a slot.

Although examples of various S-PRS patterns have been described in FIGS. 8 and 9, the scope of the disclosure is not limited thereto.

In addition, a positioning method that can be supported by a terminal may be defined as a terminal capability. For example, an SL-TDOA, an SL-AOD, SL Multi-RTT, SL RTT, an SL E-CID, an SL-AOA, etc., but is not limited thereto. A supportable SL positioning method may be determined by UE capability, and corresponding capability information may be transmitted to other UEs and BSs.

When a terminal performs positioning through an SL, configuration information related to positioning may be (pre-)configurated. For example, S-PRS information may be (pre-)configurated as positioning-related information. Specifically, activation/deactivation of S-PRS transmission may be (pre-)configurated. When S-PRS transmission is deactivated, even if S-PRS transmission is indicated/requested through an LS or other terminal, the corresponding terminal may not perform S-PRS transmission.

In addition, when the transmission bandwidth (allocation area in frequency) and period (allocation area in time) of the S-PRS may be configured in various ways, the corresponding information may be (pre-)configurated.

As another example, as described with reference to FIGS. 8 to 9, the usable comb pattern and number of PRS symbols, and the location (start symbol) at which PRSs are transmitted in slots may be (pre-)configurated. As another example, information about a positioning method may be (pre-) configurated as positioning-related information. For example, it may be (pre-)configurated which positioning methods are available. As the positioning method of the UE, there may be SL-TDOA, SL-AOD, SL Multi-RTT, SL RTT, SL E-CID, SL-AOA, etc., and the SL positioning method that can be supported is determined by UE capability, and the corresponding capability information may be transmitted to other terminals and a BS. In addition, among the SL positioning methods that may be supported based on UE capability, a usable positioning method may be (pre-)configurated.

As discussed with reference to Table 1, when the terminal does not receive positioning configuration from another terminal or an LS, the terminal may comply with positioning configuration information that is pre-configured and then stored therein. For example, in this case, the terminal may be out of the network coverage. As another example, no positioning-related configuration information is received from any other terminals. After a certain time point, the terminal may be configured with positioning information from another terminal or an LS. In a case corresponding UE (no LS) or LS (through UE) of Table 1 in which the terminal is configured with positioning information from another terminal, the corresponding information may have been transmitted via broadcast, unicast, or groupcast through an SL, and may be indicated by SCI (first-stage SCI or second-stage SCI), or may be indicated by PC5-RRC or an SL MAC-CE. In a case corresponding LS (through UE) in which an LS is connected to a terminal and the terminal is configured with positioning information, the corresponding information may be indicated from a higher level of the terminal. However, in a case corresponding to LS (through BS) of Table 1 in which the terminal is configured with positioning information from the LS connected to the BS, the terminal may be configured with the corresponding information from the BS in a cell-common manner. Here, cell-common may indicate that terminals in a cell receive the same information configuration from a BS. In this case, the terminals may consider a method for receiving an SL-SIB from the BS and obtaining cell-common information. In addition, in a case corresponding to LS (through BS) of Table 1 in which the terminal is configured with positioning information from an LS connected to a BS, the corresponding information may mean that the terminal is configured in a UE-specific manner after establishing an RRC connection with the BS.

As described above, when the terminal does not receive positioning configuration from another terminal or an LS, the terminal may transmit or receive a positioning signal according to positioning configuration information that is pre-configured and is then stored therein. The terminal may be configured with positioning information from another terminal or an LS after a certain time point. In this case, the configured information may be one or more pieces of information. For example, in the case of S-PRS information, it may be determined that only one pattern is configured, and more than one pattern information may be allowed to be configured.

When one or more pattern information is configured, the terminal may transmit the corresponding configuration information to the BS and an LS. An LS may determine an appropriate S-PRS pattern and indicate the determined S-PRS pattern to the terminal. However, the terminal may determine a pattern used in one or more pieces of S-PRS pattern information and transmit the corresponding information to other terminals via broadcast, unicast, or groupcast through an SL. In this case, the corresponding information may be indicated through SCI (first-stage SCI or second-stage SCI) or may be indicated through PC5-RRC or SL MAC-CE.

As another example, it may be determined that the information about the positioning method is (pre-)configured in only one method, and it may be allowed to (pre-)configure information about one or more positioning methods. Here, the information about the positioning method may include information about whether the method is UE-based or UE-assisted.

Alternatively, the information about the positioning method may include information about whether the method is absolute positioning, relative positioning, or ranging.

Alternatively, the information about the positioning method may include information about whether the method is SL-TDOA, SL-AOD, SL Multi-RTT, SL E-CID, or SL-AOA.

When one or more pieces of pattern information is configured, the terminal may transmit the corresponding configuration information to a BS or an LS. The LS may determine an appropriate positioning method and indicate the determined positioning method to the terminal. However, the terminal may determine a method used in information about one or more positioning methods and transmit the corresponding information to other terminals via broadcast, unicast, or groupcast through a SL. In this case, the corresponding information may be indicated through SCI (first-stage SCI or second-stage SCI) or may be indicated through PC5-RRC or SL MAC-CE.

When the terminal performs positioning through an SL, the terminal may transmit a positioning signal through the SL. Here, the positioning signal may be referred to as an S-PRS. Methods of transmitting a positioning signal in an SL may be classified into two categories:

Transmission of positioning signal from a PosRef terminal to a target terminal, or Transmission of positioning signal from a target terminal to a PosRef terminal.

Depending on the positioning method used, one or both of the above categories may be performed. For example, when SL-TDOA is performed, SL positioning may be performed by transmitting an S-PRS by using the first method. However, when SL multi-RTT or SL RTT is performed, both of the S-PRS transmission methods may be required.

Referring again to FIG. 7, UE-A and UE-B may correspond to a target terminal and a PosRef terminal, respectively. However, in FIG. 7, UE-A and UE-B are not limited to Target UE and PosRef UE, respectively. In other words, UE-A may correspond to a PosRef terminal and UE-B may correspond to a target terminal. In addition, the S-PRS transmitted from the PosRef terminal to the target terminal and the S-PRS transmitted from the target terminal to the PosRef terminal may be positioning signals of the same type or different types of positioning signals.

In addition, in the SL, the terminal may perform absolute positioning, relative positioning, or ranging. First of all, as described above, absolute positioning (absolute position) may mean two-dimensional (x,y) and three-dimensional (x,y,z) coordinate position information of the terminal by longitude and latitude. A target terminal may require a plurality of PosRef terminals for absolute positioning. In addition, the target terminal should receive known location information from the plurality of PosRef terminals for absolute positioning. For example, when a target terminal performs RTT with a plurality of PosRef terminals, there may be a plurality of pairs between the target terminal and one PosRef terminal in FIG. 7. In addition, this may be named as multi-RTT. Then, relative positioning (relative position) may mean relative two-dimensional or three-dimensional position information from other terminals. Therefore, for relative positioning of the target terminal, e.g., as illustrated in FIG. 7, only one PosRef terminal may be required. In addition, the target terminal should receive known location information from corresponding PosRef terminals. In addition, by additionally measuring or receiving direction information, the target terminal may identify relative two-dimensional or three-dimensional position information from the PosRef terminal. Ranging may mean measuring a distance or direction from another terminal. In the case of measuring a distance, e.g., as illustrated in FIG. 7, only one PosRef terminal may be required.

In addition, when only measuring distance or direction from other terminals, there is no need to receive known location information from PosRef terminals. When ranging in the SL includes both distance and direction information, ranging may have the same meaning as relative positioning.

Second Embodiment

A second embodiment includes a method for selecting and allocating resources for transmitting an SL positioning signal.

As described above, the following may be included as an SL positioning signal.

S-PRS,

Measurement report, and/or

Location information transfer.

However, in the disclosure, an SL positioning signal is not limited to the above signals. For example, an SL positioning signal may be a signal requesting S-PRS or a signal including information necessary to perform positioning. The terminal may allocate a resource for transmitting the positioning signal as described above and transmit the signals in the corresponding resource. The following alternatives may be considered as a resource allocation method for positioning signal transmission. However, the disclosure is not limited to the following alternatives.

Alternative 1: Positioning signal transmission in a resource region in which PSSCH is transmitted Alternative 2: Positioning signal transmission in a dedicated resource that is distinct from a resource region in which the PSSCH is transmitted In Alternative 1, a terminal may transmit a positioning signal in a resource region allocated according to the existing SL resource allocation method for PSSCH transmission. Specifically, a terminal may be allocated resources for PSSCH transmission from a BS, or a terminal may allocate resources for PSSCH transmission through direct sensing and resource selection. When positioning signal transmission is performed in a resource region where the PSSCH is transmitted, as in Alternative 1, resource efficiency can be increased by sharing transmission resources of the positioning signal and PSSCH. However, collision and interference between the positioning signal and the signal transmitted through the PSSCH may occur. This may cause the accuracy of SL positioning not to be guaranteed.

In Alternative 2, a method for transmitting a positioning signal in a dedicated resource that is distinct from a resource region in which PSSCH is transmitted may be considered. Specifically, a terminal may be allocated resources for positioning signal transmission separated from the resource region for PSSCH transmission from the BS, or a terminal may allocate resources for positioning signal transmission separated from the resource region for PSSCH transmission through direct sensing and resource selection. Through this method, it is possible to improve positioning accuracy by avoiding resource collision and interference between a signal transmitted through the PSSCH and a positioning signal. In addition, when allocating transmission resources for S-PRS transmission, it may be possible to more flexibly allocate transmission time and frequency region of S-PRS. However, since the transmission resources of the positioning signal and PSSCH are always separately used, resource efficiency may be lowered.

As a resource allocation method for positioning signal transmission, it may be considered that one of Alternatives 1 and 2 presented above is selected, or both alternatives 1 and 2 are used. For example, when Alternative 1 and Alternative 2 are both considered, which method is supported may be (pre-)configurated. For example, in when (pre-)configuration as Alternative 1 or (pre-)configuration as Alternative 2 is used, a terminal may operate in the (pre-)configured alternative. However, when both Alternative 1 and Alternative 2 are (pre-)configurated or 'either one' (pre-)configuration method is allowed, a terminal should operate by selecting one of Alternative 1 and Alternative 2. In this case, information on which alternative is selected and operated may be transmitted to other terminals via broadcast, unicast, or group cast through an SL. In this case, the corresponding information may be indicated through SCI (e.g., first-stage SCI or second-stage SCI) or may be indicated through PC5-RRC or SL MAC-CE.

As another example, when both Alternatives 1 and 2 are used, a terminal may select Alternative 1 or 2 according to conditions. The conditions may include required positioning accuracy. For example, when high positioning accuracy is required, Alternative 2 may be selected to avoid resource collision and interference between a signal transmitted through the PSSCH and a positioning signal. Alternatively, Alternative 1 may be selected when high positioning accuracy is not required. In the disclosure, among positioning signals, a method in which S-PRS operates as Alternative 2 and other positioning signals such as measurement report or location information transfer operates as Alternative 1 may be considered.

Figure 10:
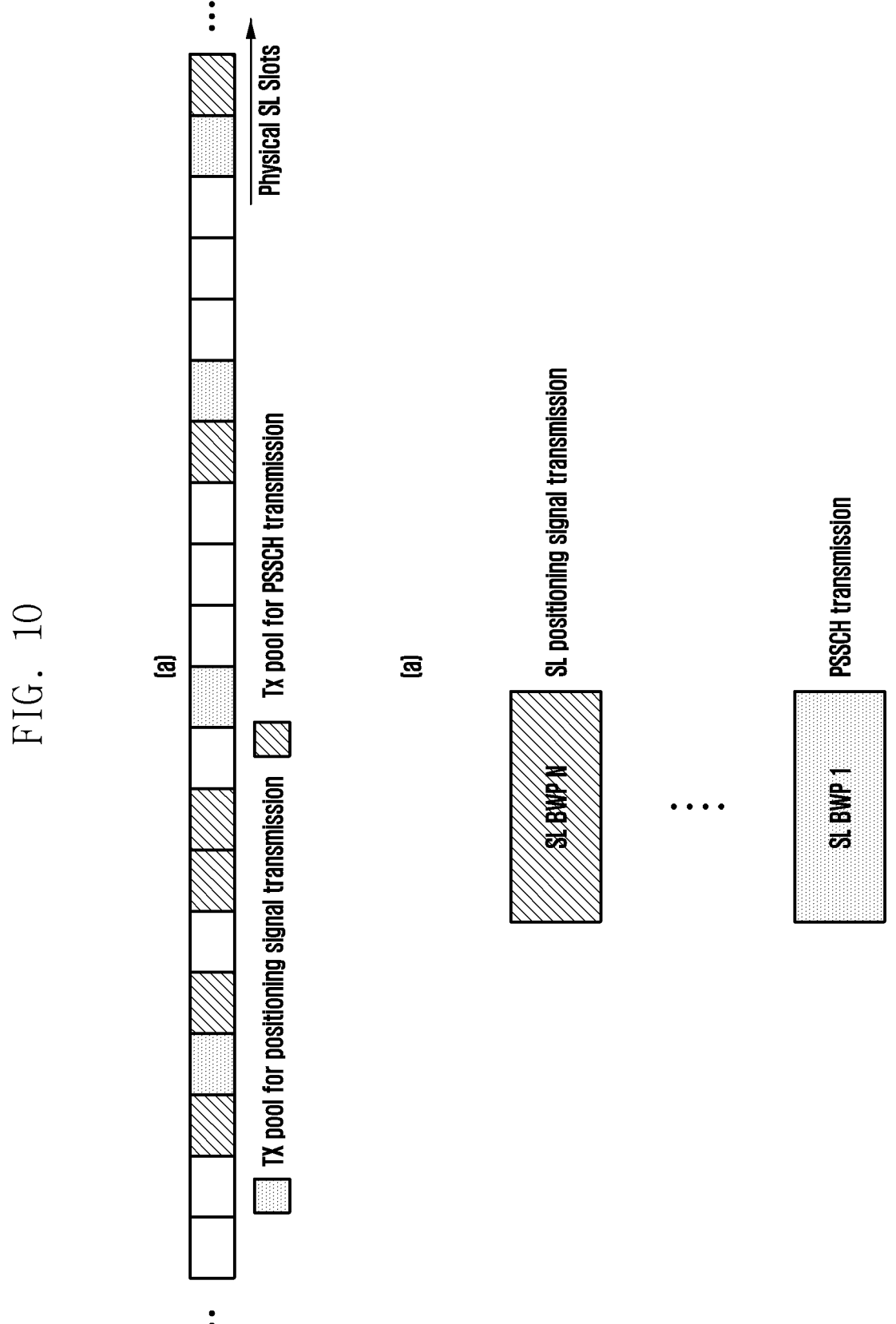
FIG. 10 illustrates a method for transmitting an SL positioning signal in a dedicated resource region that is distinguished from a resource region in which a physical SL shared channel (PSSCH) is transmitted, according to an embodiment.

FIG. 10 illustrates a method for transmitting an SL positioning signal in a dedicated resource region that is distinguished from a resource region in which a PSSCH is transmitted, according to an embodiment. Specifically, FIG. 10 illustrates an example for explaining Alternative 2.

Referring to FIG. 10, in (a), a resource region in which a PSSCH is transmitted and a resource region in which a positioning signal is transmitted may be distinguished through a TX pool. Specifically, transmission resource regions may be distinguished by configuring the TX pool of PSSCH and the TX pool of positioning signals so as not to overlap in a time domain.

In (b) in FIG. 10, a resource region in which a PSSCH is transmitted and a resource region in which a positioning signal is transmitted may be distinguished through SL BWP. When a plurality of SL BWPs are supported in the SL, a specific SL BWP may be classified as a BWP for PSSCH transmission and another SL BWP for positioning signal transmission, which is distinguished from the BWP for PSSCH transmission, through classification in the frequency region. However, in order to support such a scheme, the terminal may be required to additionally perform an SL BWP switching operation.

Herein, the method for transmitting a positioning signal in a dedicated resource region that is distinct from a resource region in which a PSSCH is transmitted is not limited to the method described with reference to FIG. 10. In addition, Alternative 2 may also be applied only to an S-PRS.

Through a method of this embodiment, allocation of resources for positioning signals may be performed in a dedicated resource region distinct from PSSCH transmission. Here, resource allocation may include both Mode 1 and Mode 2 methods.

As described above, Mode 1 is a method in which the BS performs resource allocation and provides resource allocation information to the terminal through DL control information (DCI). The BS may receive information necessary for positioning signal transmission resource allocation from a target terminal or LS. Corresponding information may be information related to positioning requirements necessary to perform SL positioning. In Mode 1, the terminal may perform resource allocation with the resource allocation information indicated through the corresponding DCI, and may indicate the corresponding information to other terminals through SCI. Unlike this, Mode 2 is a method in which the terminal performs resource allocation through direct sensing. After performing the resource allocation, the terminal may indicate resource reservation information to other terminals through SCI. In Mode 1, DCI for positioning signal transmission resource allocation may be a new DCI format distinguished from the existing DCI format 3_0 (e.g., DCI format 3_1). In addition, in Mode 2, SCI indicating resource allocation information for positioning signal transmission may be a new SCI format distinguished from the existing SCI format LA (e.g., SCI format 1_B).

When selecting and allocating positioning signal transmission resources, the terminal and the BS need to select the following parameters to satisfy positioning requirements. Herein, the parameters considered in the selection and allocation of positioning transmission resources are not limited to the parameters length of symbols that may be allocated to S-PRS within one slot, the number of subchannels that may be allocated to S-PRS, S-PRS repetition factor, S-PRS latency bound, density on frequency at which S-PRS is transmitted, S-PRS comb size, or S-PRS power, as described below.

Length of Symbols that May be Allocated to S-PRS within One Slot

A length of symbols allocable to an S-PRS within one slot may refer to FIGS. 8 to 9. In FIGS. 8 and 9, the S-PRS may be designed with symbols of various lengths. The length of the symbols allocable to the S-PRS within one slot may be (pre-)configurated. In this case, the (pre-)configurated length of the symbols allocable to the S-PRS may be configured to one value or one or more values. When the (pre-)configurated length of the symbols allocable S-PRS is configured to one or more values, the terminal may determine the length of S-PRS symbols and indicate the corresponding information to other terminals through SCI (first-stage SCI or second-stage SCI) or PC5-RRC or SL MAC-CE. In the case indicated through SCI, a new SCI format may be defined. The terminal may determine the start position and length of symbols through which the S-PRS is transmitted in a slot according to the resource allocation result of the S-PRS.

The Number of Sub-Channels that May be Allocated to S-PRS

The number of sub-channels that may be allocated to S-PRS may also be (pre-)configured. When the (pre-)configured number of sub-channels allocable to S-PRS is configured to one or more candidate values, the terminal may determine the number of sub-channels and indicate the corresponding information to other terminals through SCI (first-stage SCI or second-stage SCI) or through PC5-RRC or SL MAC-CE. In the case indicated through SCI, a new SCI format may be defined. The terminal may determine the number of sub-channels allocated to the S-PRS in a slot according to the resource allocation result of S-PRS.

S-PRS Repetition Factor

The S-PRS repetition factor indicates that S-PRS is transmitted repeatedly in one or more slots, and a repeatable factor may be (pre-)configured. In this case, the (pre-)configured S-PRS repetition factor may be configured to one value or one or more values. Depending on the configured value, S-PRS repetition may be impossible. When the (pre-)configured S-PRS repetition factor is configured to one or more values, the terminal may determine the S-PRS repetition factor and indicate the information to other terminals through SCI (first-stage SCI or second-stage SCI) or through PC5-RRC or SL MAC-CE. In the case indicated by SCI, a new SCI format may be defined. The terminal may determine the S-PRS repetition factor according to the resource allocation result of the S-PRS. For example, the S-PRS repetition factor may be applied in consecutive logical slots of the SL. Alternatively, the S-PRS repetition factor may also be applied to non-consecutive logical slots of SL, or the S-PRS repetition factor may be limited and applied only to physically consecutive slots.

S-PRS Latency Bound

The S-PRS latency bound is a requirement for S-PRS transmission. When the transmission resource is allocated for an S-PRS, if the transmission time of corresponding resource is delayed, delay may occur in performing positioning, so it should satisfy the S-PRS latency when selecting and allocating S-PRS transmission resources. A value related to the S-PRS latency bound may be (pre-)configurated.

Density on Frequency at which S-PRS is Transmitted

The density on frequency at which S-PRS is transmitted may indicate whether S-PRS is transmitted every RB in a frequency region with 1 density in RB units, whether S-PRS is transmitted every 2 RBs in a frequency region with ½ density in RB units, or whether S-PRS is transmitted every 4 RBs in a frequency region with ¼ density in RB units, and a corresponding density may be (pre-)configured. In this case, the (pre-)configurated density in RB units on a frequency of S-PRS may be configured to one value or one or more values. When the (pre-)configurated density in RB units on a frequency of S-PRS is configured to one or more values, the terminal may determine the density in RB units on a frequency of S-PRS and indicate corresponding information to other terminals through SCI (first-stage SCI or second-stage SCI) or through PC5-RRC or SL MAC-CE. In the case indicated through SCI, a new SCI format may be defined. The terminal may determine the density in RB units on a frequency of S-PRS according to the resource allocation result of S-PRS.

S-PRS Comb Size

The comb size of S-PRS may be referred to FIGS. 8 to 9. In FIGS. 8 and 9, an S-PRS may be transmitted in various comb sizes. The comb size allocable to S-PRS may be (pre-)configurated. In this case, the (pre-)configurated comb size may be configured to one value or one or more values. When the (pre-)configurated S-PRS comb size is configured to one or more values, a terminal may determine the the S-PRS comb size and indicate corresponding information to other terminals through SCI (first-stage SCI or second-stage SCI) or through PC5-RRC or SL MAC-CE. In the case indicated through SCI, a new SCI format may be defined. The terminal may determine the S-PRS comb size according to the resource allocation result of S-PRS.

S-PRS Power

S-PRS power may be adjusted based on SL pathloss or DL pathloss, and the adjustable power range may be (pre-)configurated.

In general, the longer the length of a symbol allocable to an S-PRS within one slot, the greater the number of sub-channels allocable to the S-PRS, the greater the S-PRS repetition factor, the higher the frequency density through which the S-PRS is transmitted, and the smaller the S-PRS comb size, the greater the time and frequency regions in which the S-PRS is transmitted, so positioning accuracy may be improved. In addition, as the S-PRS power increases, positioning accuracy may be improved. Therefore, when selecting and allocating S-PRS transmission resources, the terminal and the BS may determine an allocated S-PRS symbol length, the number of allocated S-PRS sub-channels, a PRS repetition factor, density on a frequency in which S-PRS is transmitted, S-PRS comb size, etc., to satisfy positioning requirements. In addition, S-PRS power may be adjusted.

When a plurality of TX resource pools for S-PRS transmission is configured for a terminal, and when a terminal should select one TX resource pool for S-PRS transmission, the terminal may select TX resource pool for S-PRS transmission based on configuration information related to the following parameters that are (pre-)configured in the TX resource pool.

Length of symbols allocable to S-PRS within one slot,
The number of sub-channels allocable to S-PRS,
S-PRS repetition factor,
S-PRS latency bound,
Density on a frequency at which S-PRS is transmitted,
S-PRS comb size, and/or
S-PRS power.

Specifically, a terminal may select a TX resource pool that may satisfy positioning accuracy. For example, when TX resource pools A and B are configured, when the (pre-)configured length of symbol allocable to an S-PRS is short in the case of TX resource pool A, and the (pre-)configured length of symbol length allocable to an S-PRS is long in the case of TX resource pool B, the terminal may select TX resource pool B in the case of high positioning accuracy requirement.

Figure 11:
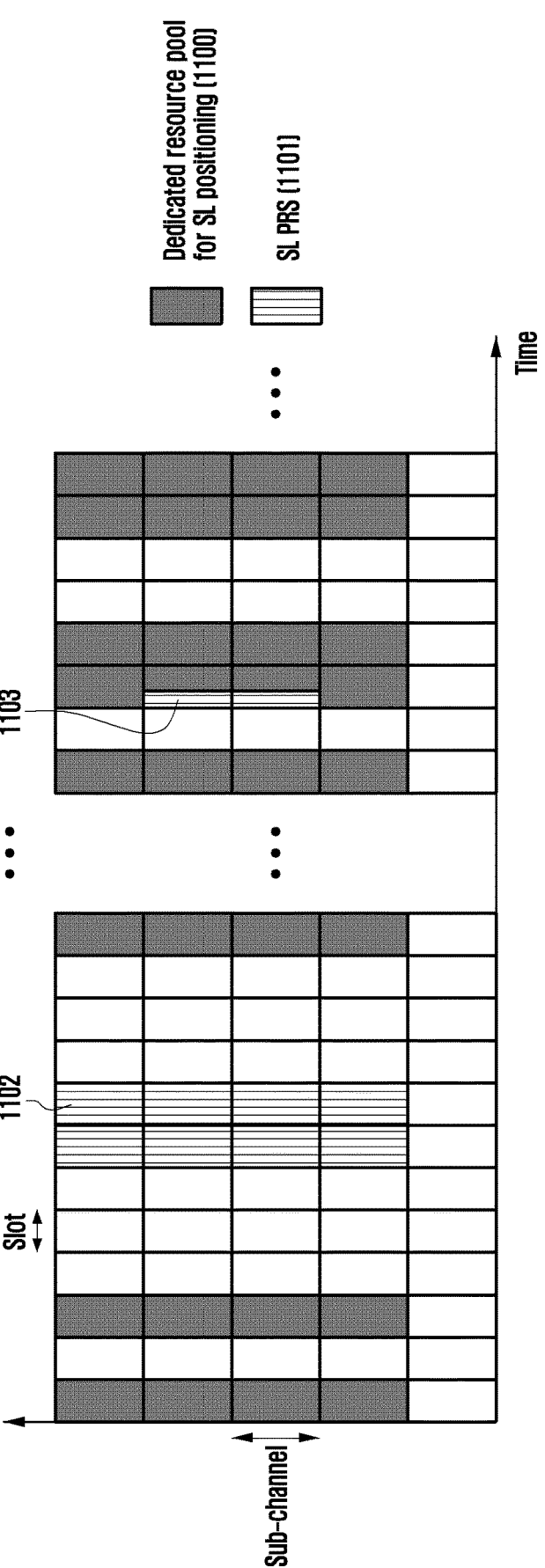
FIG. 11 illustrates applying a related parameter when selecting and allocating transmission resources of an S-PRS, according to an embodiment of the disclosure.

FIG. 11 illustrates applying a related parameter when selecting and allocating transmission resources of an S-PRS, according to an embodiment.

Referring to FIG. 11, 1100 represents a resource pool region dedicatedly allocated for SL positioning, i.e., S-PRS transmission. As described above, a corresponding region may be a region distinguished from a resource pool region in which a PSSCH is transmitted. 1101 represents a resource region allocated for S-PRS transmission in region 1100. 1102 and 1103 illustrate examples of different resource allocation. Specifically, 1102 illustrates a case where an S-PRS is allocated to all symbols in one slot, a case where an S-PRS repetition factor=2 (repetition in two slots), and a case where four sub-channels in frequency are allocated to an S-PRS transmission region. In contrast, 1103 illustrates a case where an S-PRS is allocated to some symbols within one slot, a case where an S-PRS repetition factor=1 (repetition is not performed), and a case where two sub-channels in frequency are allocated to an S-PRS transmission region. Compared to 1103, 1102 allocates more resources to S-PRS transmission, and may be more advantageous in improving positioning accuracy.

Third Embodiment

In a third embodiment, a structure of a slot is provided for transmitting an SL positioning signal. Specifically, when an S-PRS is transmitted, the corresponding slot structure may be different from the existing SL slot structure. In the second embodiment above, it is described that a scheme in which an S-PRS is mapped to resource domains in time and frequency may vary according to resource allocation for S-PRS transmission. In this third embodiment, a slot structure for S-PRS transmission and a method for mapping an S-PRS to time and frequency regions of slots according to resource allocation for S-PRS transmission will be described.

Figure 12:
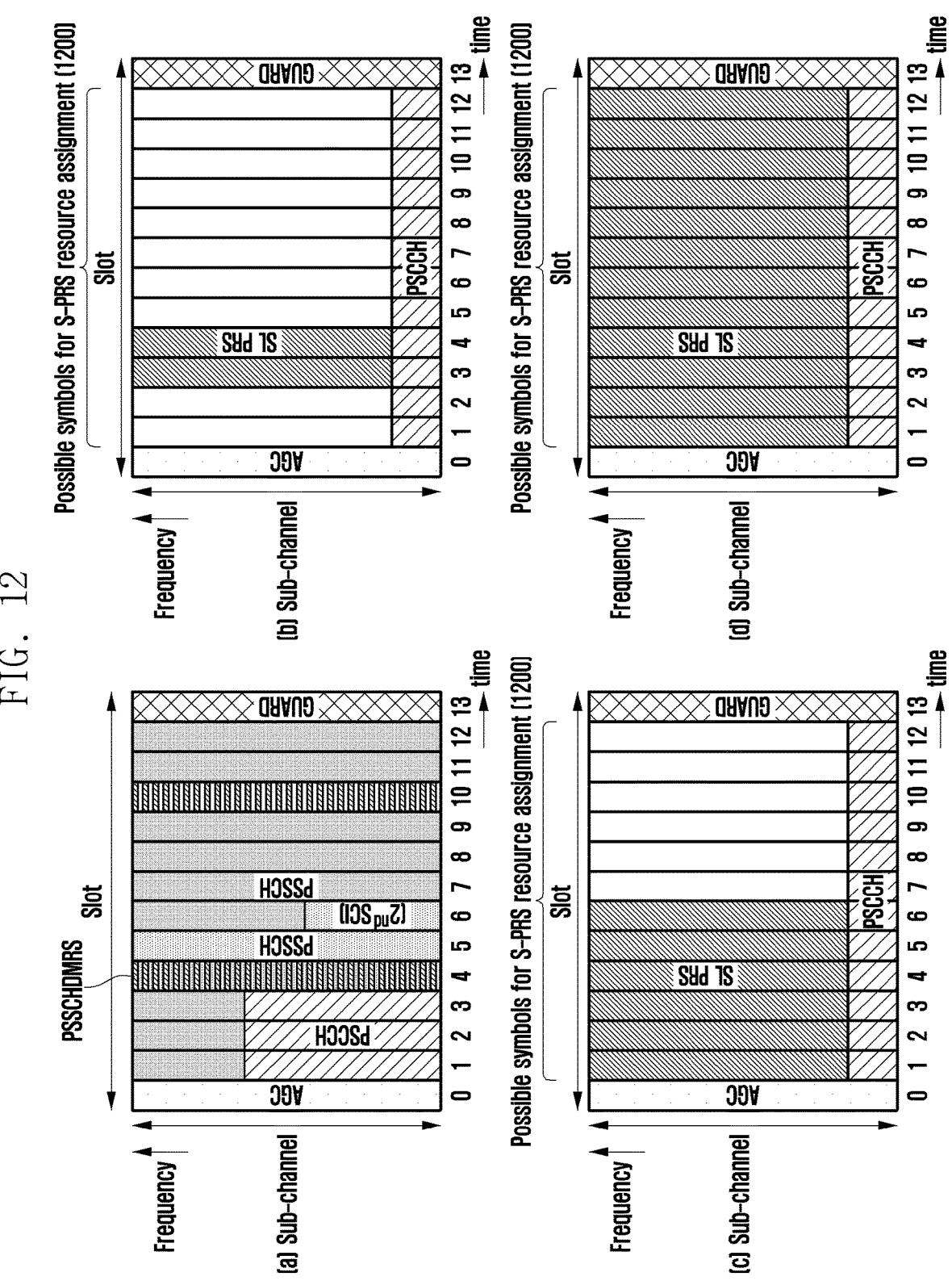
FIG. 12 illustrates a slot for transmitting an SL positioning signal according to an embodiment.

FIG. 12 illustrates a slot structure for transmitting an SL positioning signal according to an embodiment.

Referring to FIG. 12, in (a), an SL slot structure for PSSCH transmission is illustrated. Specifically, in (a), the first symbol is automatic gain control (AGC) and the last symbol may be used as a guard symbol for switching reception and transmission by a terminal. In the case of the AGC symbol, the second symbol may be duplicated and used as the AGC symbol. In addition, in (a), a PSCCH (first SCI transmission) and a PSSCH (data transmission) may be multiplexed and transmitted. Specifically, the PSCCH may be mapped in the PSSCH and time division multiplexed (TDMed) or TDMed and FDMed, from the lowest PRB in which PSSCH is scheduled in consecutive 2 or 3 symbols following the AGC symbol, and transmitted. In addition, the second SCI may be mapped to a symbol in which the first PSSCH demodulation reference signal (DMRS) is transmitted in a PSSCH region, and transmitted. When an S-PRS is transmitted in the SL slot structure illustrated in (a), one or more of the following restrictions may be applied.

- S-PRS may be transmitted in a symbol in which PSSCH is transmitted,
- S-PRS is not transmitted in a symbol in which PSCCH is transmitted,
- S-PRS is not transmitted in a symbol in which second SCI is transmitted, or
- S-PRS is not transmitted in a symbol in which PSSCH DMRS is transmitted.

When the above restrictions are transmitted and an S-PRS is transmitted in the SL slot structure illustrated in (a) of FIG. 12, the number of symbols capable of transmitting the S-PRS may be limited.

In (b) to (d) of FIG. 12, examples of SL slot structures for positioning signal transmission are illustrated. Specifically, as illustrated in (b) to (d), the first symbol may be used as an AGC symbol and the last symbol may be used as a guard symbol. For example, in the case of the AGC symbol, the second symbol may be duplicated and used as the AGC symbol, or in the case where a signal is not transmitted in the second symbol, the first symbol through which the S-PRS is transmitted may be duplicated and used as the AGC symbol. Alternatively, the first symbol through which the S-PRS is always transmitted may be duplicated and used as an AGC symbol.

When using the SL slot structure in (a), a newly designed slot structure for S-PRS transmission may be considered to solve the problem that the number of symbols through which S-PRS may be transmitted may be limited. For example, the second SCI transmission may not be necessary. However, the first SCI transmission through PSCCH may be necessary for terminal sensing and indication of S-PRS related information.

As described above with reference to FIGS. 8 and 9, when the symbol lengths of various S-PRSs are considered and the starting position and length of a symbol through which an S-PRS is transmitted in a slot is determined according to the resource allocation of the S-PRS, as illustrated in (b) to (d) in FIG. 12, it may be more advantageous that transmission regions for PSCCH (first SCI transmission) and the S-PRS are multiplexed in FDM. This is because, in the case where the PSCCH is transmitted as illustrated in (a) of FIG. 12, the frequency region to which the S-PRS is allocated may be different in the symbol region in which the PSCCH is transmitted and in the symbol region in which the PSCCH is not transmitted. Specifically, a slot structure in which transmission region for a PSCCH (first SCI transmission) and an S-PRS are multiplexed in FDM is illustrated in (b) to (d) of FIG. 12. In this case, the frequency region allocated to the PSCCH may be located at the bottom in the region in which the S-PRS is transmitted, and may occupy a fixed frequency area of X RBs. In this case, X=2 RBs may be considered. However, in the disclosure, the method for mapping PSCCH is not limited to the method in (b) to (d) of FIG. 12.

According to (b) in FIG. 12, only two symbols of symbol index=3 and 4 are selected and allocated for an S-PRS in a symbol region 1200 in which the S-PRS may be transmitted. According to (c) in FIG. 12, 6 symbols of symbol index=1 to 6 are selected and allocated for an S-PRS in the symbol region 1200 in which the S-PRS may be transmitted. According to (d) in FIG. 12, 12 symbols of symbol index=1 to 12 are selected and allocated for an S-PRS in the symbol region 1200 in which the S-PRS may be transmitted.

According to FIG. 12, a terminal may indicate the number of symbols and location information through which the S-PRS is currently transmitted through a PSCCH (first SCI transmission) as well as S-PRS-related parameter configuration information.

Fourth Embodiment

As described above, the following alternatives may be considered as the resource allocation method for positioning signal transmission described through the second embodiment.

- Alternative 1: Positioning signal transmission in a resource region in which PSSCH is transmitted
- Alternative 2: Positioning signal transmission in a dedicated resource that is distinct from a resource region in which the PSSCH is transmitted A fourth embodiment provides a congestion control method according to the above alternatives.

When Alternative 1 is considered, positioning signal transmission is considered in the resource region where the PSSCH is transmitted, so the congestion control method considered when a PSSCH is transmitted may be reused in consideration of a positioning signal. In Alternative 1, the following cases may be considered when transmitting a positioning signal.

Case 1: Positioning signal and data are transmitted together in a PSSCH region

Case 2: Only positioning signal is transmitted in a PSSCH region

In the above, a positioning signal may include all the positioning-related information such as a measurement report including an S-PRS and location information transfer, or a positioning signal may be limited to only an S-PRS. When a positioning signal is limited to only the S-PRS, positioning-related information such as measurement report and location information transfer may be classified as data transmission.

In addition, depending on the type of positioning signal, the priority of a corresponding signal may not be the same. Specifically, a priority for S-PRS transmission, a priority for a measurement report, and a priority for location information transfer may be determined separately. In addition, this may not be the same as the priority of general data transmitted through the existing PSSCH, other than positioning-related information.

Accordingly, Case 1 can be further subdivided into the following cases.

Case 1-1: Positioning signal (S-PRS) and data (general data information, not positioning-related information) are transmitted together in a PSSCH region Case 1-2: Positioning signal (S-PRS) and data (positioning related information) are transmitted together in a PSSCH region In the above Cases 1-1 and 1-2, the positioning signal in the PSSCH region is limited to the S-PRS. In this case, data transmission may be classified into a case of positioning-related information (Case 1-2) and a case of non-positioning-related information (Case 1-1). For example, in Cases 1-1 and 1-2, as illustrated in (b) to (c) of FIG. 12, an S-PRS may be transmitted in some regions of a slot and data may be transmitted in other regions of the slot. When performing congestion control in Case 1 (Cases 1-1 and 1-2), the terminal may determine transmission parameters based on channel busy ratio (CBR) and priority. The sixth embodiment may be referred for the CBR measurement. The fifth embodiment may be referred for the transmission parameters.

When the terminal performs congestion control in Case 1 (Cases 1-1 and 1-2), one of the following assumptions about priority may be considered. It is noted that the assumptions for priority in this disclosure are not limited to the following assumptions.

Assumption 1: Priority is assumed for data transmission. Corresponding priority may be determined by a higher level of the terminal and may be mapped to the priority provided as the first SCI through a PSCCH.

Assumption 2: Priority is assumed for a positioning signal (S-PRS). Corresponding priority may be determined by a higher level of the terminal, and the corresponding priority may be provided to SCI (first SCI) through a PSCCH. In the case indicated by SCI, a new SCI format may be defined.

Assumption 3: Priority is assumed to be Max (priority for positioning signal (S-PRS), priority for data transmission). Corresponding priorities may be determined by a higher level of the terminal, and a Max priority value may be provided as SCI (first SCI) through a PSCCH. In the case indicated by SCI, a new SCI format may be defined.

Assumption 4: Priority is assumed to be Min (priority for positioning signal (S-PRS), priority for data transmission). Corresponding priorities may be determined by a higher level of the terminal, and a Min priority value may be provided as SCI (first SCI) through PSCCH. In the case indicated by SCI, a new SCI format may be defined.

In contrast, since Case 2 is a case in which only positioning signals are transmitted in a PSSCH region, when congestion control is performed, the terminal may determine transmission parameters based on a CBR and priority for positioning signals. In addition, corresponding priority may be determined by a higher level of the terminal, and the corresponding priority may be provided as SCI (first SCI) through PSCCH. In the case indicated by SCI, a new SCI format may be defined.

In addition, since positioning signals are transmitted in the resource region where PSSCH is transmitted according to Alternative 1, Case 2 may include the terminal receiving resource allocation from a BS for PSSCH transmission (Mode1), or the terminal allocating resources through direct sensing (Mode2). When the terminal performs PSSCH transmission, the following situations may occur. In addition, the terminal may determine whether Case 2 may be performed according to the following situations.

Situation 1: Only a positioning signal (S-PRS) to be transmitted in a PSSCH region The terminal may transmit the positioning signal (S-PRS) in a PSSCH region according to Case 2. The priority for the positioning signal (S-PRS) may be determined by a higher terminal, and the corresponding priority may be provided to SCI (first SCI) through a PSCCH. In addition, the corresponding priority may be used for congestion control.

Situation 2: Only data (positioning-related information) signals to be transmitted in a PSSCH region The terminal may transmit data (positioning-related information) in the PSSCH region. Priority for data (positioning-related information) may be determined by a higher layer of the terminal, and the corresponding priority may be provided to SCI (first SCI) through a PSCCH. In addition, the corresponding priority may be used for congestion control.

Situation 3: Only data (general data information, not positioning-related information) signals to be transmitted in a PSSCH region The terminal may transmit data (general data information, not positioning-related information) in the PSSCH region. The priority for data (general data information, not positioning-related information) may be determined by a higher level of the terminal, and the corresponding priority may be provided to SCI (first SCI) through a PSCCH. In addition, the corresponding priority may be used for congestion control.

Situation 4: A positioning signal (S-PRS) and a data (positioning-related information) signal to be transmitted in a PSSCH region The terminal may always prioritize the positioning signal (S-PRS), or may always prioritize the data (positioning-related information) signal, or may select a signal based on the priorities of the positioning signal (S-PRS) and data (positioning related information) signal. The corresponding priority may be determined by a higher level of the terminal. In the priority-based case, the terminal may determine a signal to be transmitted based on the higher priority value among the two signals. In addition, the priority of the signal to be transmitted may be provided to SCI (first SCI) through a PSCCH. In addition, the corresponding priority may be used for congestion control.

Situation 5: A positioning signal (S-PRS) and data (general data information, not positioning-related information) signals to be transmitted in a PSSCH region The terminal may always prioritize the positioning signal (S-PRS), or may always prioritize data (general data information, not positioning-related information) signal, or may determine which signal to transmit based on the priorities for the positioning signal (S-PRS) and data (general data information, not positioning-related information). The corresponding priority may be determined by a high level of the terminal. In the priority-based case, the terminal may determine the signal to be transmitted based on the higher priority value among the two signals. In addition, the priority of the signal to be transmitted may be provided to SCI (1st SCI) through a PSCCH. In addition, the priority may be used for congestion control.

Situation 6: A positioning signal (S-PRS) and data (positioning-related information and general data information other than positioning-related information) signals to be transmitted in a PSSCH region The terminal may always prioritize the positioning signal (S-PRS), or may always prioritize the data (positioning-related information) signal, or may always prioritize the data (general data information, not positioning-related information) signal, or may determine which signal to transmit based on priorities for the positioning signal (S-PRS), data (positioning-related information) signals, and other data (general data information, not positioning-related information) signals. The corresponding priority may be determined by a higher level of the terminal. In the priority-based case, the terminal may determine the signal to be transmitted based on a higher priority value among the corresponding signals. In addition, the priority of the signal to be transmitted may be provided to SCI (first SCI) through a PSCCH. In addition, the corresponding priority may be used for congestion control.

Situation 7: A data (positioning-related information) signal and another data (general data information, not positioning-related information) signal to be transmitted in a PSSCH region The terminal may always prioritize the data (positioning-related information) signal, or may always prioritize the data (general data information, not positioning-related information) signal, or may determine which signal to transmit based on priorities for the data (positioning-related information) signal and another data (general data information, not positioning-related information) signal. The corresponding priority may be determined by a higher level of the terminal. In the priority-based case, the terminal may determine a signal to be transmitted based on a higher priority value among the two signals. In addition, the priority of the signal to be transmitted may be provided to SCI (first SCI) through a PSCCH. In addition, the corresponding priority may be used for congestion control.

When positioning signal transmission is performed in a dedicated resource region in Alternative 2, the following detailed alternatives may be considered. However, the disclosure is not limited to the detailed alternatives below.

Alternative 2-1: Not only S-PRS but also data (positioning-related information) may be transmitted in a dedicated resource region Alternative 2-2: Only S-PRS is transmitted in a dedicated resource region In Alternative 2-1, similar to Alternative 1 (Case 1-2), a congestion control method may be considered. In addition, when Alternative 2-2 is considered, similar to Alternative 1 (Case 2, situation 1), a congestion control method may be considered. In addition, when Alternative 2 is considered, since positioning signal transmission is considered in a dedicated resource region that is distinct from a resource region in which a PSSCH is transmitted, a congestion control method for positioning signal transmission may be separately defined. When congestion control is performed, the terminal may determine transmission parameters based on a CBR and priority for a positioning signal. The sixth embodiment may be referred for the CBR measurement. The fifth embodiment may be referred for the transmission parameters.

Fifth Embodiment

A fifth embodiment includes a transmission parameter adjustment method according to a congestion control method for positioning signal transmission. The terminal may adjust whether to transmit a positioning signal and related transmission parameters in consideration of congestion of SL transmission. Specifically, an S-PRS may be transmitted in a time and frequency manner different from PSSCH transmission, and accordingly, parameters for S-PRS transmission may be defined differently from PSSCH transmission.

When performing congestion control, the terminal may determine transmission parameters based on a CBR and priority. The sixth embodiment may be referred for the CBR measurement. The fourth embodiment may be referred for the priority. However, congestion control for SL positioning signals may also be considered when priority is not used and only a CBR is used.

Figure 13:
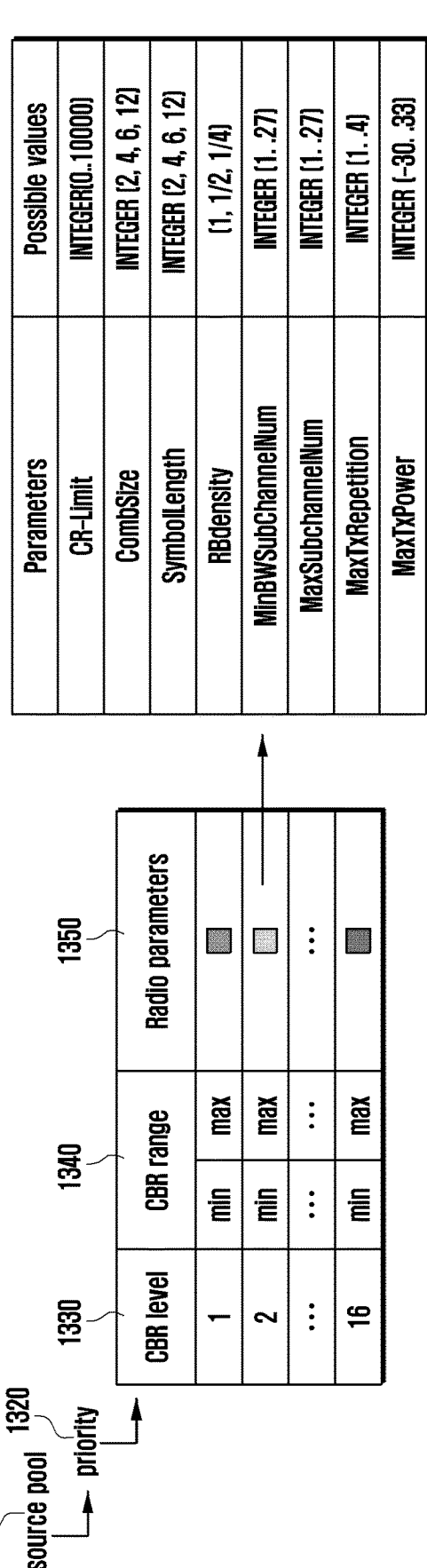
FIG. 13 illustrates a method for determining a transmission parameter according to congestion control when transmitting an SL positioning signal according to an embodiment.

FIG. 13 illustrates a method for determining a transmission parameter according to congestion control when transmitting an SL positioning signal according to an embodiment.

Referring to FIG. 13, transmission parameter configuration range 1350 corresponding to a CBR range 1340, CBR level 1330, and a priority 1320 of signal to be transmitted may be (pre-)configured through a resource pool configuration 1310. Corresponding values may be pre-configured in the terminal before the terminal is connected to the BS, or may be configured from the BS through an SIB, or may be configured specific to the terminal after an RRC connection with the BS. Alternatively, the terminal may be configured through PC5-RRC connection between terminals.

The terminal may perform a CBR measurement for congestion control. The CBR may be measured as a value between 0 and 100. The terminal may determine the CBR level 1330 by determining whether the measured CBR corresponds to the min/max value of the CBR range 1340. For example, in FIG. 13, the CBR may be divided into a maximum of X=16 CBR levels. Therefore, for congestion control, the terminal may refer to the priority 1320, CBR level 1330, and corresponding transmission parameter configuration range 1350 of the signal to be transmitted. When a priority is not used for congestion control for SL positioning signals and only a CBR is used, the terminal may refer to the CBR level 1330 and the transmission parameter configuration range 1350 corresponding to the CBR level 1330.

Details of the configuration range 1350 of transmission parameters related to the SL positioning signal are described below.

CR-Limit

The CR-Limit may refer to an upper limit of channel occupancy ratio (CR). Here, the CR is a measurement value indicating how much the terminal has occupied a channel and how much the terminal plans to occupy a channel. The seventh embodiment may be referred for the CR measurement. The terminal may measure the CR and perform congestion control so that corresponding measured value is less than a CR-Limit. For example, the CR-Limit may be configured to a smaller value for a congested channel (i.e., a case of a large CBR level). In addition, the CR-Limit may be configured to a larger value as the terminal has a higher priority. In FIG. 13, e.g., a corresponding value may be configured in the range of INTEGER (0.10000).

CombSize

The CombSize is a size of a comb of an S-PRS. As described above with reference to FIGS. 8 and 9, an S-PRS may be transmitted in various comb sizes. The terminal may perform congestion control through CombSize adjustment. For example, the CombSize may be configured to a smaller value for a congested channel (i.e., a case of a large CBR level). The smaller the CombSize, the higher the probability of an S-PRS colliding in a congested channel. In FIG. 13, e.g., a corresponding value may be configured in the range of INTEGER (2, 4, 6, 12).

SymbolLength

The SymbolLength is a length of symbols that may be allocated to an S-PRS within one slot. As described above with reference to FIGS. 8 and 9, the S-PRS can be designed with symbols of various lengths. The terminal may perform congestion control through SymbolLength adjustment. For example, the SymbolLength may be configured to a smaller value for a congested channel (i.e., a case of a large CBR level). The larger the SymbolLength, the higher the probability of an S-PRS collisions in a congested channel. In FIG. 13, e.g., a corresponding value may be configured in the range of INTEGER (2, 4, 6, 12).

RBdensity

The RBdensity is a density on frequency at which an S-PRS is transmitted, and may indicate whether the S-PRS is transmitted every RB in a frequency region with 1 density in RB units, whether the S-PRS is transmitted every 2 RBs in a frequency region with ½ density in RB units, or whether the S-PRS is transmitted every 4 RBs in a frequency region with ¼ density in RB units. The terminal may perform congestion control through RBdensity adjustment. For example, the RBdensity may be configured to a smaller value for a congested channel (i.e., a case of a large CBR level). The higher the RBdensity, the higher the probability of S-PRS collisions in a congested channel. In FIG. 13, e.g., a corresponding value may be configured in the range of (1, ½, ¼).

MinBWSub-channelNum, MaxSub-channelNum

The MinBWSub-channelNum and MaxSub-channelNum may represent the minimum and maximum values of the number of sub-channels that may be allocated to an S-PRS within one slot, respectively. The terminal may perform congestion control through adjustment of MinBWSub-channelNum and MaxSub-channelNum. For example, for a congested channel (i.e., a case of a large CBR level), the number of sub-channels allocable to an S-PRS may be configured to a smaller value. The greater the number of allocatable sub-channels, the higher the probability of S-PRS collisions in a congested channel. In FIG. 13, e.g., corresponding values may be configured in the range of INTEGER (1 . . . 27).

MaxTxRepetition

The MaxTxRepetition may indicate a maximum value for S-PRS repetition, and the S-PRS repetition may indicate that an S-PRS is repetitively transmitted in one or more slots. The terminal may perform congestion control through MaxTxRepetition adjustment. For example, for a congested channel (i.e., a case of a large CBR level), the value of MaxTxRepetition may be configured to a smaller value. As the S-PRS repetition value increases, the probability of S-PRS collisions in a congested channel may increase. In FIG. 13, e.g., corresponding values may be configured in the range of INTEGER (1 . . . 4).

MaxTxPower

The MaxTxPower may indicate a maximum value for S-PRS power. The terminal may perform congestion control through MaxTxPower adjustment. For example, for a congested channel (i.e., a case of a large CBR level), the value of MaxTxPower may be configured to a smaller value. As the value of MaxTxPower increases, the probability of interference to an S-PRS in a congested channel may increase. In FIG. 13, e.g., corresponding values may be configured in the range of INTEGER (−30 . . . 33).

Sixth Embodiment

A sixth embodiment includes a method for defining a CBR to perform congestion control for positioning signal transmission.

A CBR is an index indicating how much a current channel is occupied by terminals, and may determine whether a corresponding channel of an SL is congested. The terminal may determine whether a corresponding channel is congested by the CBR value measured according to a CBR definition as described below. The terminal may report a measured CBR to a BS. Specifically, when the BS and the terminal are connected through Uu-RRC, the CBR value measured by the terminal may be reported to the BS through the Uu-RRC.

Although a scenario in which a CBR is measured based on an SL received signal strength indicator (RSSI) and a scenario in which a CBR is measured based on an S-PRS are described below, the disclosure is not limited thereto.

CBR is Measured Based on SL RSSI

When the CBR is measured based on an SL RSSI, the CBR measured in slot n may be defined as follows.

The CBR may be defined as a ratio of sub-channels in which an SL RSSI measured by the terminal in a resource pool exceeds a (pre-)configured threshold. Here, the CBR measurement may be performed in slot [n–X, n–1]. The slot index may be based on a physical slot index.

X represents a window value where the CBR is measured, and the value of X may be a fixed value or a configurable value. For example, the value of X may be a fixed value of 100 slots or a value of $100 \cdot 2^{\mu}$ slots that is determined according to SCS μ. However, in the disclosure, the method for determining the X value, i.e., the method for determining the CBR measurement window, is not limited to a specific method.

The SL RSSI is a received signal strength and may represent how much power (in [W]) is received from the terminal. For example, as illustrated in (a) of FIG. 12, the SL RSSI may be defined as an average received power observed in symbols corresponding to the PSCCH and PSSCH regions from the OFDM symbol following the AGC symbol and corresponding subj-channels.

CBR is Measured for S-PRS (Method 1)

When the CBR is measured for an S-PRS, the CBR measured in slot n may be defined as follows.

The CBR may be defined as a ratio of sub-channels transmitting S-PRSs in which an SL PRS-RSSI measured by the terminal in a resource pool exceeds a (pre-)configured threshold. The CBR measurement may be performed in slot [n–X, n–1]. The slot index may be based on a physical slot index.

X represents a window value where the CBR is measured, and the value of X may be a fixed value or a configurable value. For example, the value of X may be a fixed value of 100 slots or a value of $100 \cdot 2^\mu$ slots that is determined according to SCS $\mu$. However, in the disclosure, the method for determining the X value, i.e., the method for determining the CBR measurement window, is not limited to a specific method.

The SL PRS-RSSI is a received signal strength of an S-PRS and may represent the power (in [W]) of the S-PRS received from the terminal. For example, as illustrated in (b) to (c) of FIG. 12, the SL RSSI may be defined as an average S-PRS received power observed in OFDM symbols through which an S-PRS is transmitted and a corresponding sub-channel region. In this case, the SL PRS-RSSI may be replaced with other terms.

CBR is Measured for S-PRS (Method 2)

When CBR is measured for an S-PRS, the CBR measured in slot n may be defined as follows.

The CBR may be defined as a ratio of RBs transmitting S-PRSs in which an SL PRS-RSSI measured by the terminal in a resource pool exceeds a (pre-)configured threshold. The CBR measurement may be performed in slot [n–X, n–1], and the slot index may be based on a physical slot index.

X represents a window value where the CBR is measured, and the value of X may be a fixed value or a configurable value. For example, the value of X may be a fixed value of 100 slots or a value of $100 \cdot 2^\mu$ slots that is determined according to SCS $\mu$. However, in the disclosure, the method for determining the X value, i.e., the method for determining the CBR measurement window, is not limited to a specific method.

The SL PRS-RSSI is a received signal strength of an S-PRS and may represent the power (in [W]) of S-PRS received from the terminal. For example, as illustrated in (b) to (c) of FIG. 12, the SL RSSI may be defined as an average S-PRS received power observed in OFDM symbols through which an S-PRS is transmitted and a corresponding RB region. In this case, the SL PRS-RSSI may be replaced with other terms.

CBR is Measured for S-PRS (Method 3)

When the CBR is measured for an S-PRS, the CBR measured in slot n may be defined as follows.

The CBR may be defined as a ratio of resource elements (REs) transmitting S-PRSs in which an SL PRS-RSSI measured by the terminal in a resource pool exceeds a (pre-) configured threshold. Here, the CBR measurement may be performed in slot [n–X, n–1], and the slot index may be based on a physical slot index.

X represents a window value where the CBR is measured, and the value of X may be a fixed value or a configurable value. For example, the value of X may be a fixed value of 100 slots or a value of $100 \cdot 2^\mu$ slots that is determined according to SCS $\mu$. However, in the disclosure, the method for determining the X value, i.e., the method for determining the CBR measurement window, is not limited to a specific method.

The SL PRS-RSSI is a received signal strength of an S-PRS and may represent the power (in [W]) of an S-PRS received from the terminal. For example, as illustrated in (b) to (c) of FIG. 12, the SL RSSI may be defined as an average S-PRS received power observed in OFDM symbols through which an S-PRS is transmitted and a corresponding RE region. In this case, the SL PRS-RSSI may be replaced with other terms.

Seventh Embodiment

A seventh embodiment includes a method for defining a CR to perform congestion control for positioning signal transmission.

The CR may be a measurement value indicating how much the terminal has occupied a channel and how much the terminal is planning to occupy a channel. The terminal may measure the CR and perform congestion control so that the measured value is less than a CR-Limit. When the CR-Limit is not satisfied, i.e., when the measured value is greater than the CR-Limit, a corresponding transmission may be dropped or other transmission parameters may be adjusted to satisfy the CR-Limit through terminal implementation.

The CR may be defined differently when it is measured for data transmitted in a PSSCH region and when it is measured for an S-PRS.

CR is Measured for Data Transmitted in a PSSCH Region

When the CR is measured for data transmitted in a PSSCH region, the CR measured in slot n may be defined as follows.

The CR may be defined as a value obtained by dividing a sum of the number of sub-channels occupied and used by the terminal at the time of slot [n–a, n–1] and the number of sub-channels allowed for the terminal to occupy and use a channel at the time of slot [n, n+b] by a total number of sub-channels configured in a transmission resource pool at the time of slot [n–a, n+b]. The slot index may be based on a physical slot index.

Here, a is a positive integer and b is 0 or a positive integer. Further, the values of a and b are either fixed values as a+b+1=1000 slots or values of $a+b+1=1000 \cdot 2^\mu$ slots, which are determined by SCS $\mu$, and may satisfy b<(a+b+1)/2 through terminal implementation. In addition, n+b cannot be configured to a value beyond the last transmission opportunity allowed through transmission resource reservation. However, in the disclosure, a method for determining a or b value, i.e., a method for determining the CR measurement window is not limited to a specific method.

CR is Measured for S-PRS

When the CR is measured for an S-PRS, the CR measured in slot n may be defined as follows.

Method 1: The CR may be defined as a value obtained by dividing a sum of the number of sub-channels transmitting the S-PRS that the terminal occupies and uses at the time of slot [n–a, n–1] and the number of sub-channels transmitting the S-PRS that the terminal is allowed to occupy and use a channel at the time of slot [n, n+b] by a total number of sub-channels configured in a transmission resource pool at the time of slot [n–a, n+b]. The slot index may be based on a physical slot index.

Method 2: The CR may be defined as a value obtained by dividing a sum of the number of RBs transmitting the S-PRS that the terminal occupies and uses at the time of slot [n–a, n–1] and the number of RBs transmitting the S-PRS that the terminal is allowed to occupy and use a channel at the time of slot [n, n+b] by a total number of RBs configured in a transmission resource pool at the time of slot [n–a, n+b]. The slot index may be based on a physical slot index.

Method 3: The CR may be defined as a value obtained by dividing a sum of the number of REs transmitting the S-PRS that the terminal occupies and uses at the time of slot [n–a, n−1] and the number of REs transmitting the S-PRS that the terminal is allowed to occupy and use a channel at the time of slot [n, n+b] by a total number of REs configured in a transmission resource pool at the time of slot [n−a, n+b]. The slot index may be based on a physical slot index.

Here, a is a positive integer and b is 0 or a positive integer. Further, the values of a and b are either fixed values as a+b+1=1000 slots or values of a+b+1=1000.2^μ slots, which are determined by SCS μ, and may satisfy b<(a+b+1)/2 through terminal implementation. In addition, n+b cannot be configured to a value beyond the last transmission opportunity allowed through transmission resource reservation. However, in the disclosure, a method for determining a or b value, i.e., a method for determining the CR measurement window is not limited to a specific method.

Figure 14:
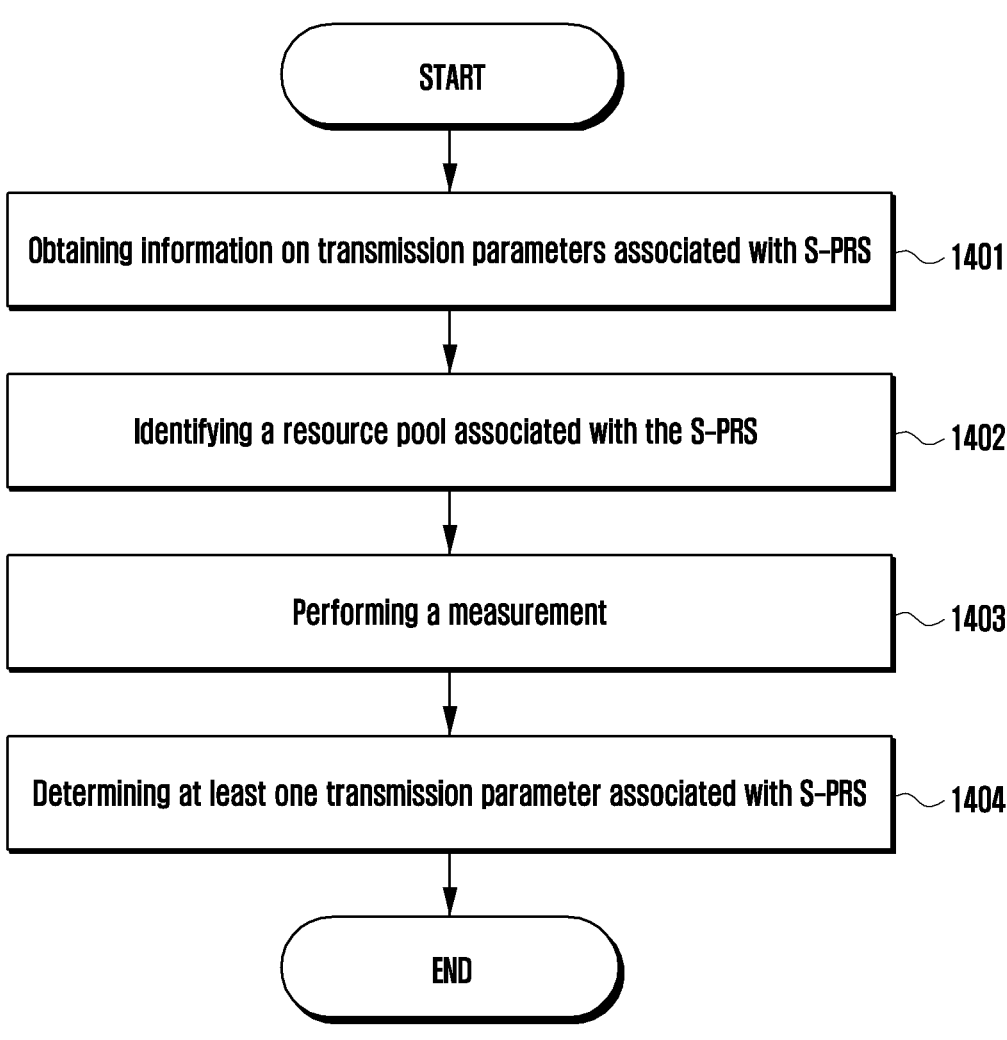
FIG. 14 is a flowchart illustrating operations of a terminal according to an embodiment.

FIG. 14 is a flowchart illustrating operations of a terminal according to an embodiment.

For example, the operations in FIG. 14 may be performed based on at least one of the above-described embodiments. Additionally, some of the operations of FIG. 14 may be omitted or two or more steps may be combined and performed as one step. Further, the sequence of FIG. 14 may be changed.

Referring to FIG. 14, in step 1401, a terminal may obtain information on transmission parameters associated with an S-PRS.

For example, the information on the transmission parameters may be configured based on the fifth embodiment. The transmission parameters may include at least one of a comb size associated with the S-PRS or a number of symbols for the S-PRS in a slot. The transmission parameters may further include at least one of (i) an RB density in a frequency domain, (ii) a minimum number of sub-channels for the S-PRS in the slot, (iii) a maximum number of sub-channels for the S-PRS in the slot, (iv) a maximum transmission number for the S-PRS, or (v) a maximum transmission power for the S-PRS.

For example, the comb size may be configured to a value as one of 2, 4, 6, or 12, and the number of symbols for the S-PRS in a slot may be configured to a value as one of 2, 4, 6, or 12.

In step 1402, the terminal may identify a resource pool associated with the S-PRS. For example, the resource pool associated with the S-PRS may be identified based on the second embodiment or the third embodiment. For example, the resource pool associated with the S-PRS may not overlap with a resource pool associated with a PSSCH in time domain.

In step 1403, the terminal may perform a measurement based on the resource pool associated with the S-PRS. The measurement may be a measurement of a CBR or a measurement of a CR. The CBR measured in a slot may be defined based on the sixth embodiment. The CR measured in a slot may be defined based on the seventh embodiment.

In step 1404, the terminal may determine at least one transmission parameter associated with the S-PRS based on the measurement and the information on transmission parameters. For example, determination for at least one transmission parameter may be based on the second embodiment and/or the fifth embodiment. Further, when priorities of an S-PRS and data are used when determining at least one transmission parameter, the fourth embodiment may be further considered.

Although not illustrated in FIG. 14, the terminal may transmit information including a result of the measurement to a BS. The BS may perform congestion control associated with the S-PRS based on the information.

Figure 15:
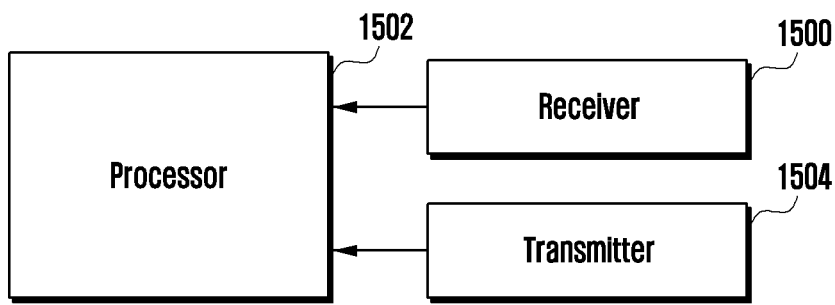
FIG. 15 illustrates a terminal according to an embodiment.

FIG. 15 illustrates a terminal according to an embodiment.

Referring to FIG. 15, the terminal includes a receiver 1500, a transmitter 1504, and a processor 1502. The receiver 1500 and the transmitter 1504 may be commonly referred to as a transceiver. The transceiver may transmit and receive a signal to and from a BS. The signal may include control information and data. To this end, the transceiver may include a radio frequency (RF) transmitter that up-converts and amplifies the frequency of a transmitted signal, an RF receiver that low-noise amplifies a received signal and down-converts the frequency, etc. Further, the transceiver may receive a signal through a wireless channel, output the signal to the processor 1502, and transmit the signal output from the processor 1502 through a wireless channel.

The processor 1502 may control a series of processes so that the terminal operates according to embodiments of the disclosure. For example, the processor 1502 may control operations for the terminal to perform positioning in an SL according to the above-described embodiment of the disclosure.

Figure 16:
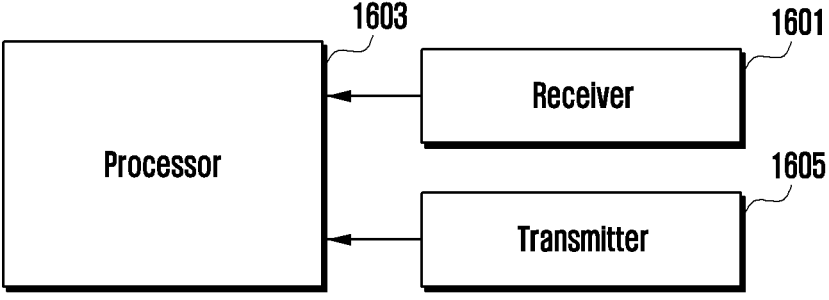
FIG. 16 illustrates a base station (BS) according to an embodiment.

FIG. 16 illustrates a BS according to an embodiment.

Referring to FIG. 16, the BS includes a receiver 1601, a transmitter 1605, and a processor 1603. The receiver 1601 and the transmitter 1605 may commonly be referred to as a transceiver. The transceiver may transmit and receive a signal to and from the terminal. The signal may include control information and data. To this end, the transceiver may include an RF transmitter that up-converts and amplifies the frequency of a transmitted signal, an RF receiver that low-noise amplifies a received signal and down-converts the frequency, etc. Further, the transceiver may receive a signal through a wireless channel, output the signal to the processor 1603, and transmit the signal output from the processor 1603 through a wireless channel.

The processor 1603 may control a series of processes so that the BS operates according to embodiments of the disclosure. For example, the processor 1603 may control operations of: the BS for terminal positioning measurement in an SL according to the above-described embodiment of the disclosure.

The above-described embodiments of the disclosure and drawings are only presented as specific examples to easily explain the technical content of the disclosure and help understanding of the disclosure, and are not intended to limit the scope of the disclosure. That is, it is obvious to those skilled in the art that other modified examples based on the technical spirit of the disclosure can be implemented. In addition, each of the embodiments can be operated in combination with each other as needed. For example, parts of all embodiments of the disclosure may be combined with each other to operate a BS and a terminal.

According to the above-described embodiments, a terminal may perform positioning (e.g., location measurement) through an SL, and positioning accuracy may be improved.

In addition, according to the above-described embodiments, a terminal may perform congestion control when performing positioning through an SL.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a terminal in a wireless communication system, the method comprising:

obtaining information on transmission parameters of a sidelink (SL) positioning reference signal (PRS), wherein the transmission parameters include a comb size of the SL PRS in a dedicated resource pool, a number of symbols of the SL PRS within a slot in the dedicated resource pool, a maximum transmission number for the SL PRS, a maximum transmission power for the SL PRS, and a channel occupancy ratio (CR) limit for the SL PRS;

identifying the dedicated resource pool for the SL PRS;

performing a measurement of a channel busy ratio (CBR) based on the dedicated resource pool for the SL PRS; and adjusting at least one of the transmission parameters of the SL PRS based on the measurement and the information on the transmission parameters, wherein the CBR measured in a slot is defined as a portion of resource blocks (RBs) in the dedicated resource pool whose received signal strength indicator (RSSI) of the SL PRS measured by the terminal exceeds a threshold sensed over a CBR measurement window.

2. The method of claim 1, wherein the transmission parameters further include at least one of a resource block density for the SL PRS in a frequency domain, a minimum number of sub-channels for the SL PRS in the slot, or a maximum number of sub-channels for the SL PRS in the slot.

3. The method of claim 1, wherein the comb size is configured to a value of 2, 4, 6, or 12, and wherein the number of symbols is configured to a value of 2, 4, 6, or 12.

4. The method of claim 1, further comprising performing a measurement of a CR based on the dedicated resource pool for the SL PRS.

5. The method of claim 4, wherein the CR in a slot n is defined as a total number of resource elements (REs) used for SL PRS transmissions in slots [n−a, n−1] and granted in slots [n, n+b] divided by a total number of configured REs in the dedicated resource pool over [n−a, n+b], where a is a positive integer, b is 0 or the positive integer, and (a+b+1=1000), and wherein, in case that the CR in the slot n exceeds the CR limit, a transmission of the SL PRS is dropped.

6. The method of claim 1, further comprising transmitting, to a base station, information including a result of the measurement.

7. The method of claim 1, wherein the dedicated resource pool for the SL PRS does not overlap with a resource pool associated with a physical SL shared channel (PSSCH) in a time domain.

8. A terminal, comprising:

a transceiver; and a controller coupled with the transceiver and configured to:

obtain information on transmission parameters of a sidelink (SL) positioning reference signal (PRS), wherein the transmission parameters include a comb size of the SL PRS in a dedicated resource pool, a number of symbols of the SL PRS within a slot in the dedicated resource pool, a maximom transmission number for the SL PRS, a maximum transmission power for the SL PRS, and a channel occupancy ratio (CR) limit for the SL PRS, identify the dedicated resource pool for the SL PRS, perform a measurement of a channel busy ratio (CBR) based on the dedicated resource pool for the SL PRS, and adjust at least one of the transmission parameters of the SL PRS based on the measurement and the information on the transmission parameters, wherein the CBR measured in a slot is defined as a portion of resource blocks (RBs) in the dedicated resource pool whose received signal strength indicator (RSSI) of the SL PRS measured by the terminal exceeds a threshold sensed over a CBR measurement window.

9. The terminal of claim 8, wherein the transmission parameters further include at least one of a resource block density for the SL PRS in a frequency domain, a minimum number of sub-channels for the SL PRS in the slot, or a maximum number of sub-channels for the SL PRS in the slot.

10. The terminal of claim 8, wherein the comb size is configured to a value of 2, 4, 6, or 12, wherein the number of symbols is configured to a value of 2, 4, 6, or 12, and wherein the dedicated resource pool for the SL PRS does not overlap with a resource pool associated with a physical SL shared channel (PSSCH) in a time domain.

11. The terminal of claim 8, wherein the controller is further configured to perform a measurement of a CR based on the dedicated resource pool for the SL PRS.

12. The terminal of claim 11, wherein the CR in a slot n is defined as a total number of resource elements (REs) used for SL PRS transmissions in slots [n−a, n−1] and granted in slots [n, n+b] divided by a total number of configured REs in the dedicated resource pool over [n−a, n+b], where a is a positive integer, b is 0 or the positive integer, and (a+b+1=1000), and wherein, in case that the CR in the slot n exceeds the CR limit, a transmission of the SL PRS is dropped.

13. The terminal of claim 8, wherein the controller is further configured to transmit, to a base station, information including a result of the measurement.

* * * * *